United States Patent
Bleidt et al.

(10) Patent No.: US 10,349,092 B2
(45) Date of Patent: Jul. 9, 2019

(54) DECODER FOR DECODING A MEDIA SIGNAL AND ENCODER FOR ENCODING SECONDARY MEDIA DATA COMPRISING METADATA OR CONTROL DATA FOR PRIMARY MEDIA DATA

(71) Applicant: Fraunhofer-Gesellschaft zur Foerderung der angewandten Forschung e.V., Munich (DE)

(72) Inventors: Robert Bleidt, Santa Clara, CA (US); Tobias Bliem, Erlangen (DE); Stefan Kraegeloh, Erlangen (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 66 days.

(21) Appl. No.: 15/589,839

(22) Filed: May 8, 2017

(65) Prior Publication Data

US 2018/0007398 A1    Jan. 4, 2018

Related U.S. Application Data

(63) Continuation of application No. PCT/EP2015/075987, filed on Nov. 6, 2015.

(30) Foreign Application Priority Data

Nov. 12, 2014  (EP) .................................... 14192907
Apr. 10, 2015  (EP) .................................... 15163198
Aug. 18, 2015  (EP) .................................... 15181428

(51) Int. Cl.
*H04N 21/233*  (2011.01)
*H04N 21/235*  (2011.01)
(Continued)

(52) U.S. Cl.
CPC ......... *H04N 21/233* (2013.01); *G10L 19/167* (2013.01); *H04N 21/235* (2013.01);
(Continued)

(58) Field of Classification Search
CPC .. H04N 21/223; H04N 21/235; H04N 21/236; H04N 21/439; H04N 21/8106; H04N 21/84; G10L 19/167
See application file for complete search history.

(56) References Cited

U.S. PATENT DOCUMENTS 4,550,425 A     10/1985  Andersen et al.
5,822,360 A  *  10/1998  Lee ....................... G10L 19/018
                                                     375/140
(Continued)

FOREIGN PATENT DOCUMENTS

CA       1109155 A1    9/1981
EP       1431961 A2    6/2004
(Continued)

OTHER PUBLICATIONS

Cossette et al., "New Techniques for Audio Metadata Use and Distribution", Proceeding of the Audio Engineering Convention Society, AES 117th,, vol. 117, Sep. 24, 1999 (Sep. 24, 1999), pp. 1-11.
(Continued)

*Primary Examiner* — Alexander Q Huerta
(74) *Attorney, Agent, or Firm* — Perkins Coie LLP; Michael A. Glenn

(57) ABSTRACT

An encoder for encoding secondary media data including metadata and control data for primary media data is shown, wherein the encoder is configured to encode the secondary media data using adding redundancy or bandlimiting and wherein the encoder is configured to output the encoded secondary media data as a stream of digital words. There-
(Continued)

fore, the stream of digital words may be formed such that it is capable to resist a typical processing of a digital audio stream. Furthermore, processors for processing a digital audio stream are able to process the stream of digital words, since the stream of digital words may be designed as an audio-like or analog-like digital stream.

36 Claims, 24 Drawing Sheets

(51) Int. Cl.
    *H04N 21/236*     (2011.01)
    *G10L 19/16*     (2013.01)
    *H04N 21/439*     (2011.01)
    *H04N 21/81*     (2011.01)
    *H04N 21/84*     (2011.01)

(52) U.S. Cl.
    CPC ......... *H04N 21/236* (2013.01); *H04N 21/439* (2013.01); *H04N 21/8106* (2013.01); *H04N 21/84* (2013.01)

(56) References Cited

U.S. PATENT DOCUMENTS

| | | | | |
|---|---|---|---|---|
| 6,209,094 B1* | 3/2001 | Levine | ................... | G06T 1/005 375/E7.018 |
| 6,226,758 B1* | 5/2001 | Gaalaas | ........... | G11B 20/10527 713/600 |
| 6,411,725 B1* | 6/2002 | Rhoads | ................... | G06F 21/10 382/100 |
| 6,571,144 B1* | 5/2003 | Moses | ................... | G10L 19/018 380/236 |
| 6,914,637 B1* | 7/2005 | Wolf | ................... | H04L 1/0057 348/473 |
| 9,596,521 B2* | 3/2017 | Winograd | ........ | H04N 21/44204 |
| 2004/0156317 A1* | 8/2004 | Lund | ................... | H04L 25/14 370/235 |
| 2004/0169595 A1* | 9/2004 | Kalker | ............. | G11B 20/00086 341/53 |
| 2005/0213726 A1* | 9/2005 | Rodman | ................. | H04L 12/66 379/202.01 |
| 2006/0107302 A1* | 5/2006 | Zdepski | ........... | H04N 21/23424 725/135 |
| 2006/0179201 A1* | 8/2006 | Riedel | ................... | G09G 5/006 710/305 |
| 2007/0016316 A1 | 1/2007 | Hanna | | |
| 2008/0317170 A1* | 12/2008 | Bentvelsen | ...... | G11B 20/00086 375/319 |
| 2011/0068898 A1* | 3/2011 | Petrovic | ................ | G10L 19/018 340/5.86 |
| 2012/0059491 A1* | 3/2012 | Carroll | ................ | G10L 19/018 700/94 |
| 2015/0228286 A1* | 8/2015 | Hooks | ................... | G10L 19/008 704/500 |
| 2015/0325115 A1* | 11/2015 | Wardle | ................... | G08C 23/02 367/197 |
| 2015/0325116 A1* | 11/2015 | Umminger, III | ....... | G08C 17/00 367/197 |
| 2015/0332685 A1* | 11/2015 | Bleidt | ................... | G10L 19/012 704/500 |
| 2016/0133263 A1* | 5/2016 | Borss | ................... | G10L 19/008 381/22 |
| 2016/0196830 A1* | 7/2016 | Riedmiller | ............ | G10L 19/167 704/500 |
| 2016/0205148 A1* | 7/2016 | Lee | ................... | H04L 65/1069 709/219 |
| 2017/0032801 A1* | 2/2017 | Baumgarte | ............. | G10L 19/26 |

FOREIGN PATENT DOCUMENTS

| | | |
|---|---|---|
| KR | 100686521 B1 | 2/2007 |
| RU | 2434277 C2 | 11/2011 |
| WO | 2012033967 A1 | 3/2012 |

OTHER PUBLICATIONS

"Advanced Televison Systems Committee", ATSC Standard: Digital Audio Compression (AC-3, E-AC-3), Nov. 24, 2015, 271 pages.
"Audio Engineering Society, Inc.", AES Recommended Practice for Digital Audio Engineering-Serial Multichannel Audio Digital Interface (MADI), 2008, 20 pages.
"Audio Engineering Society, Inc.", Revised AES Standard for Digital Audio—Digital Input-Output Interfacing - Serial Transmission Format for Two-Channel Linearly Represented Digital Audio Data (Revision of AES3-1992), 2003, 31 pages.
"Audio Engineering Society, Inc.", AES Standard for Audio Applications of Networks—High-performance Streaming Audio-Over-IP Interoperability, 2013, 43 pages.
"Digital Video Broadcasting (DVB)", ETSI TS 101 154 V1.9.1 Specification for the Use of Video and Audio Coding in Broadcasting Applications Based on the MPEG-2 Transport Stream, Sep. 2009, 163.
"Dolby Laboratories Inc.", Post It With Dolby E, 2003, 4 pages.
"ISO/IEC 14496-3 International Standard", Information technology—Coding of Audio—Visual Objects—Part 3: Audio, 2009, 1416 pages.
"ISO/IEC 23003-1 International Standard", Information Technology—MPEG Audio Technologies—Part 1: MPEG Surround, Feb. 15, 2007, 288.
"Snell Ltd.", White Paper Dolby E Processing Working With Dolby E in a Broadcast Environment, Nov. 2011, 4 pages.
Newman, William M, "Principles of Interactive Computer Graphics", Copyright 1979, 1973 by McGraw-Hill, Inc., 1979, 3 pages.
Oomen, Werner et al., "A Variable-Bit-Rate Buried-Data Channel for Compact Disc", Philips Research Laboratories, Eindhoven, The Netherlands Institute for Perception Research, Eindhoven, The Netherlands, 6 pages.
Smith, Julius O. et al., "A Flexible Sampling-Rate Conversion Method", IEEE Systems Control Technology & Center for Computer Research in Music and Acoustics Department of Music, Stanford University or Symmetry Group, 1984, 4 pages.
Broesch, James, "Digital Signal Processing Demystified", Digital Signal Processing Demystified, XP055494837, ISBN: 978-1-878707-16-1, pp. 119-136, Chapter 9, FIR Filter Design, Jan. 1, 1997, 119-136.

* cited by examiner

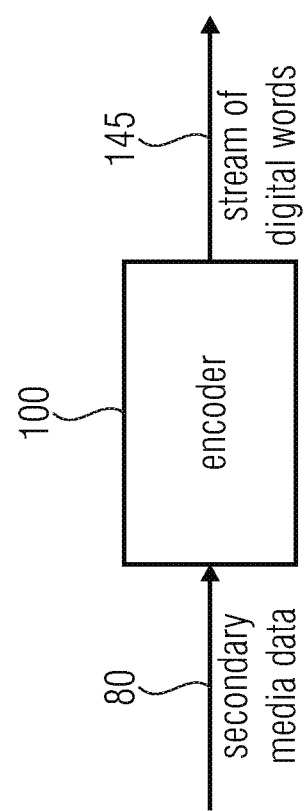

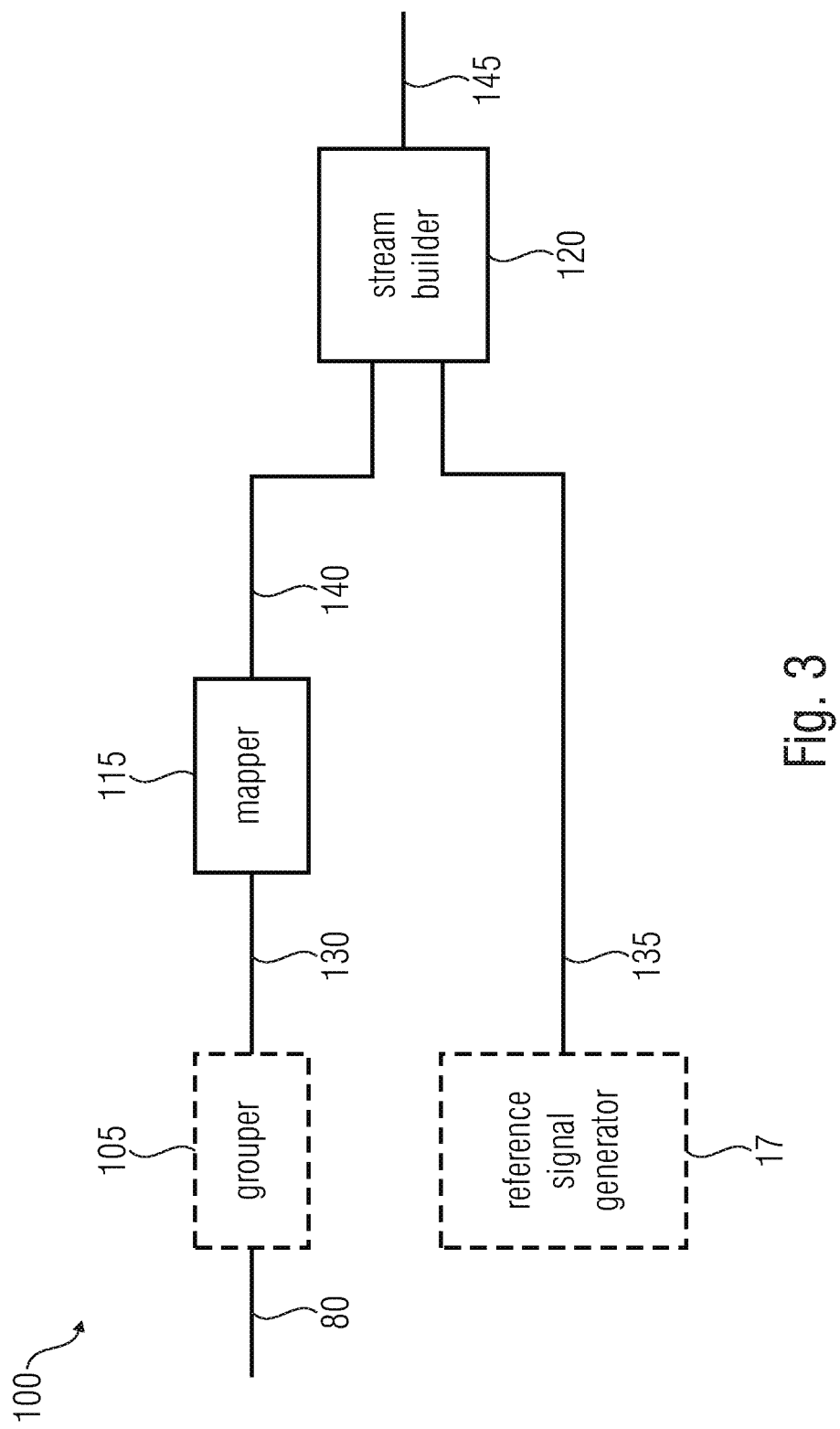

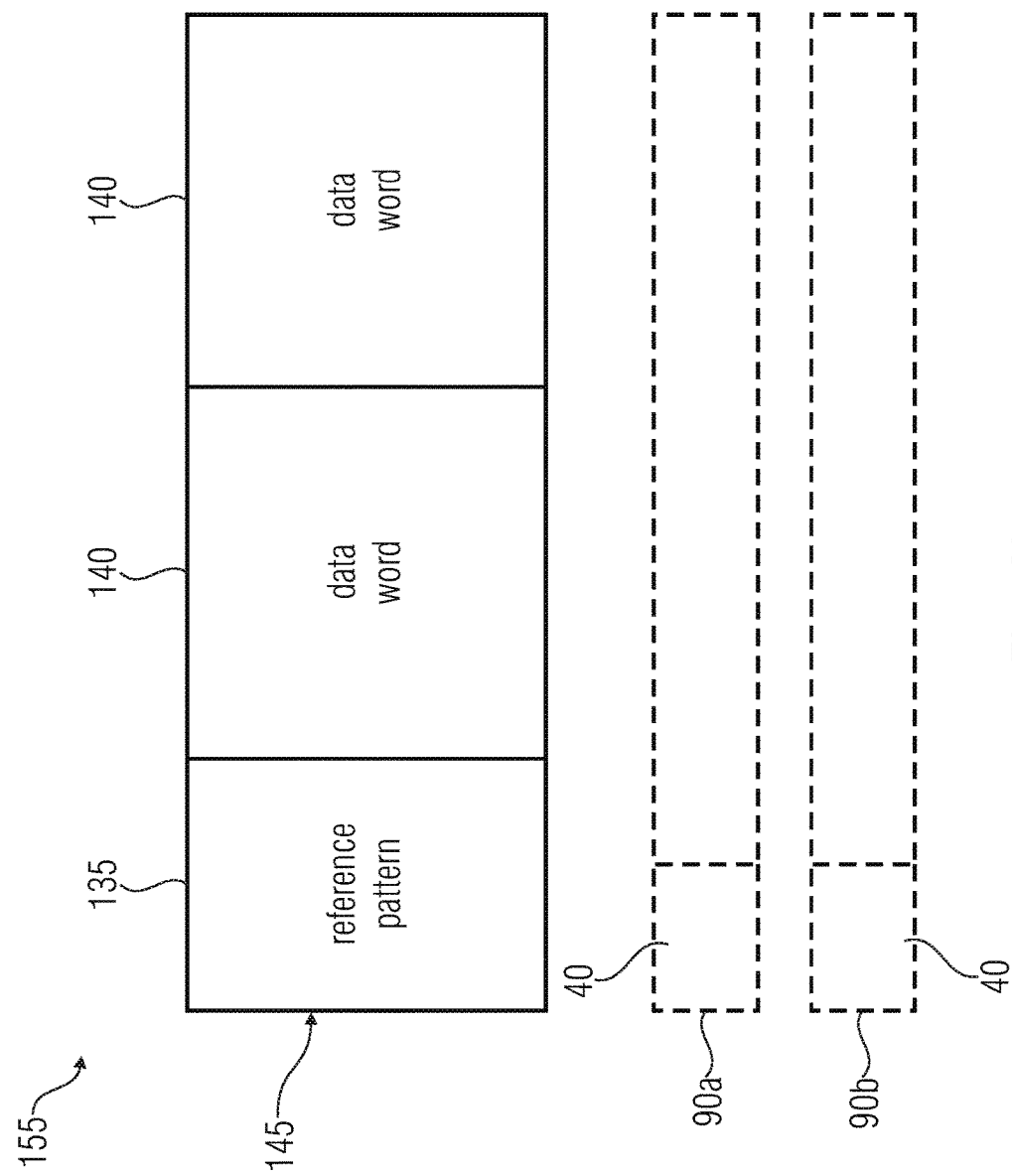

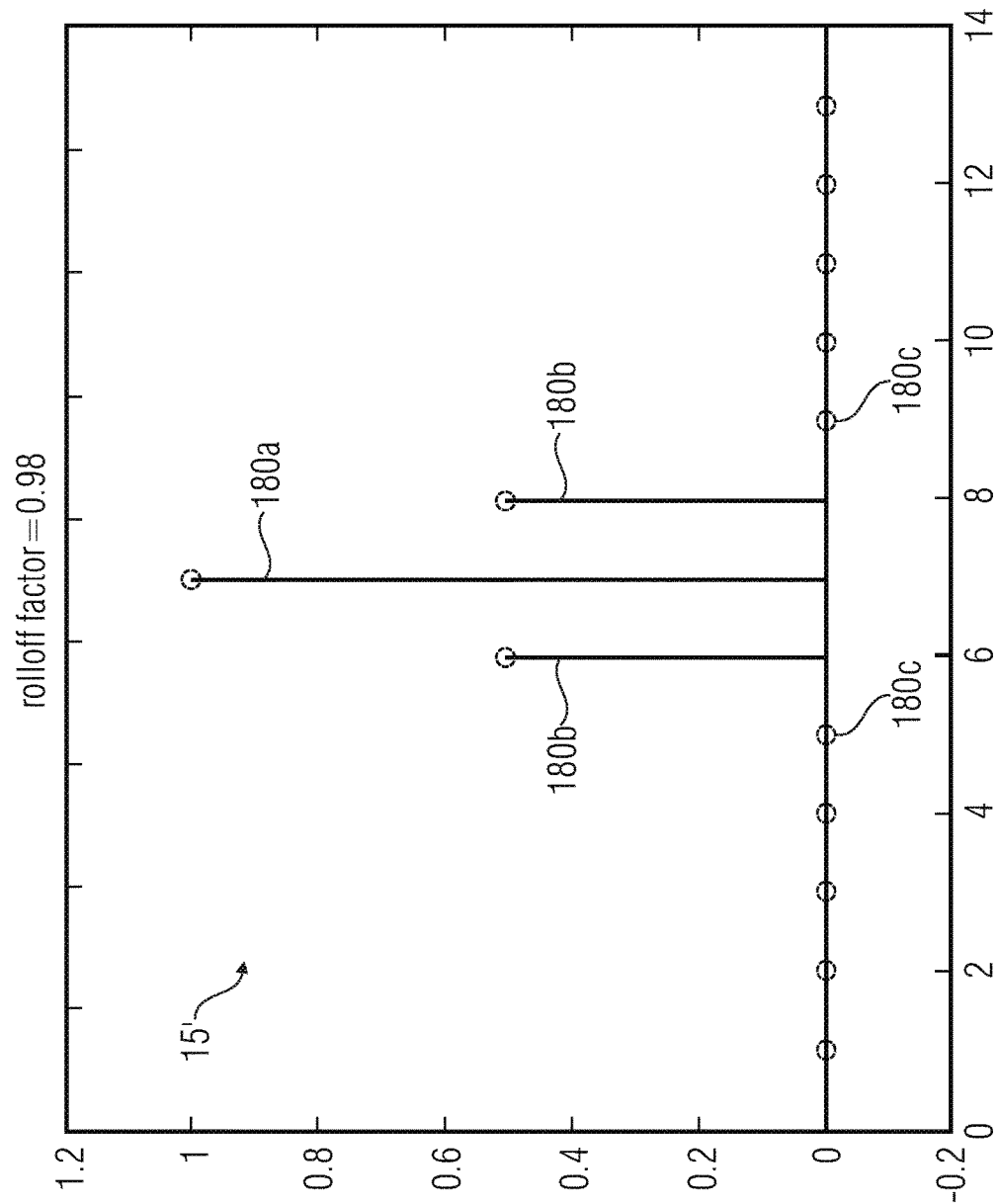

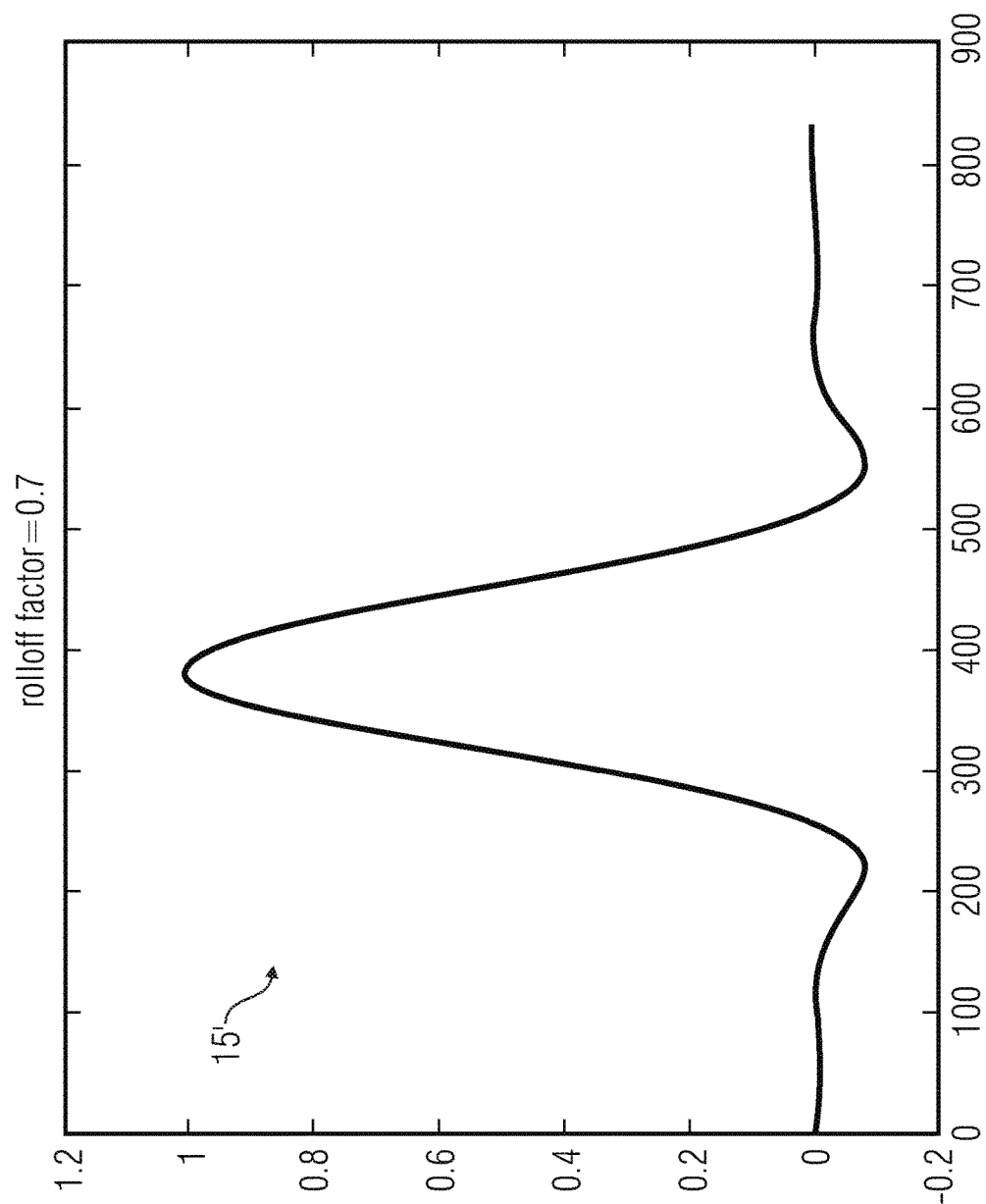

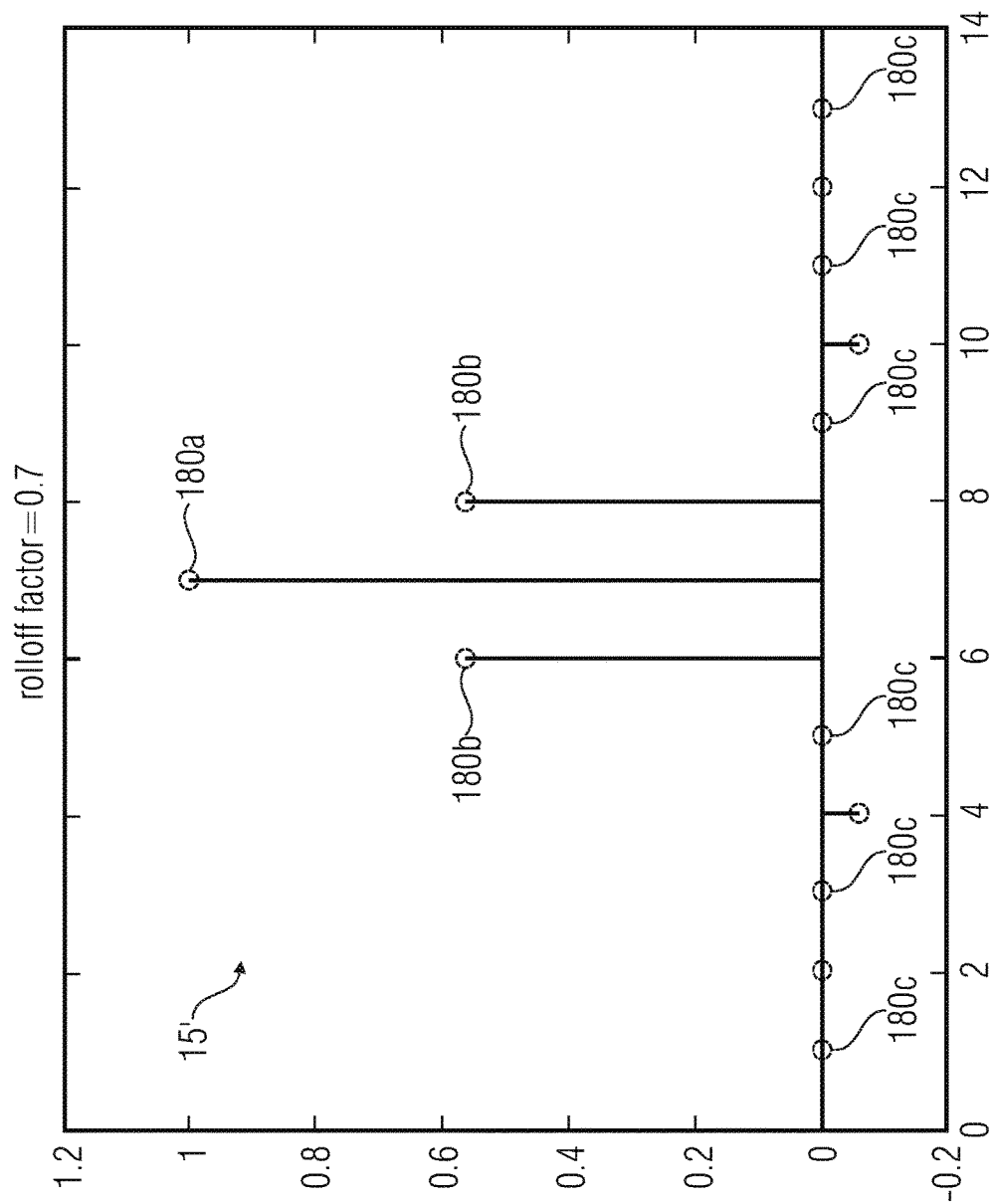

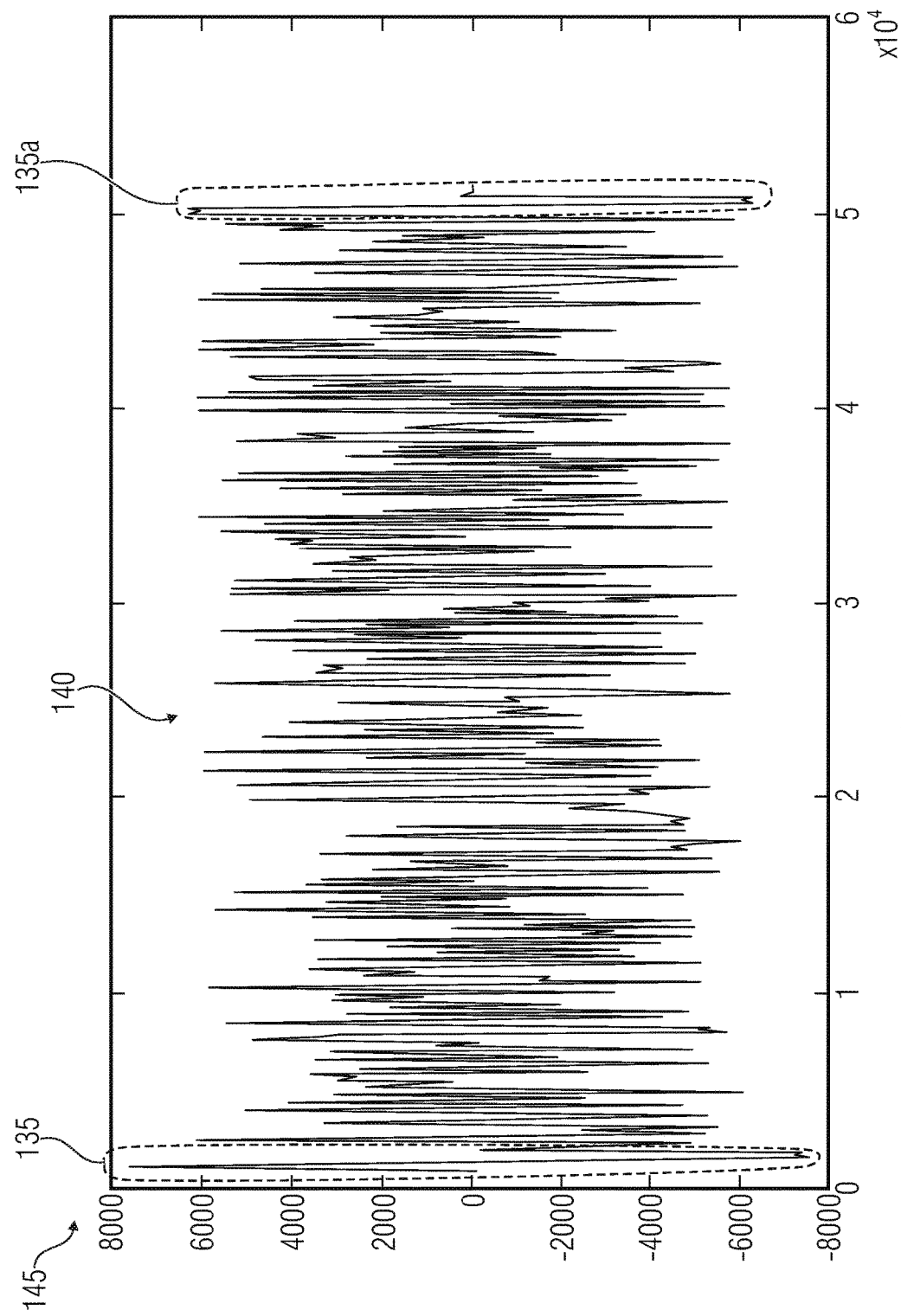

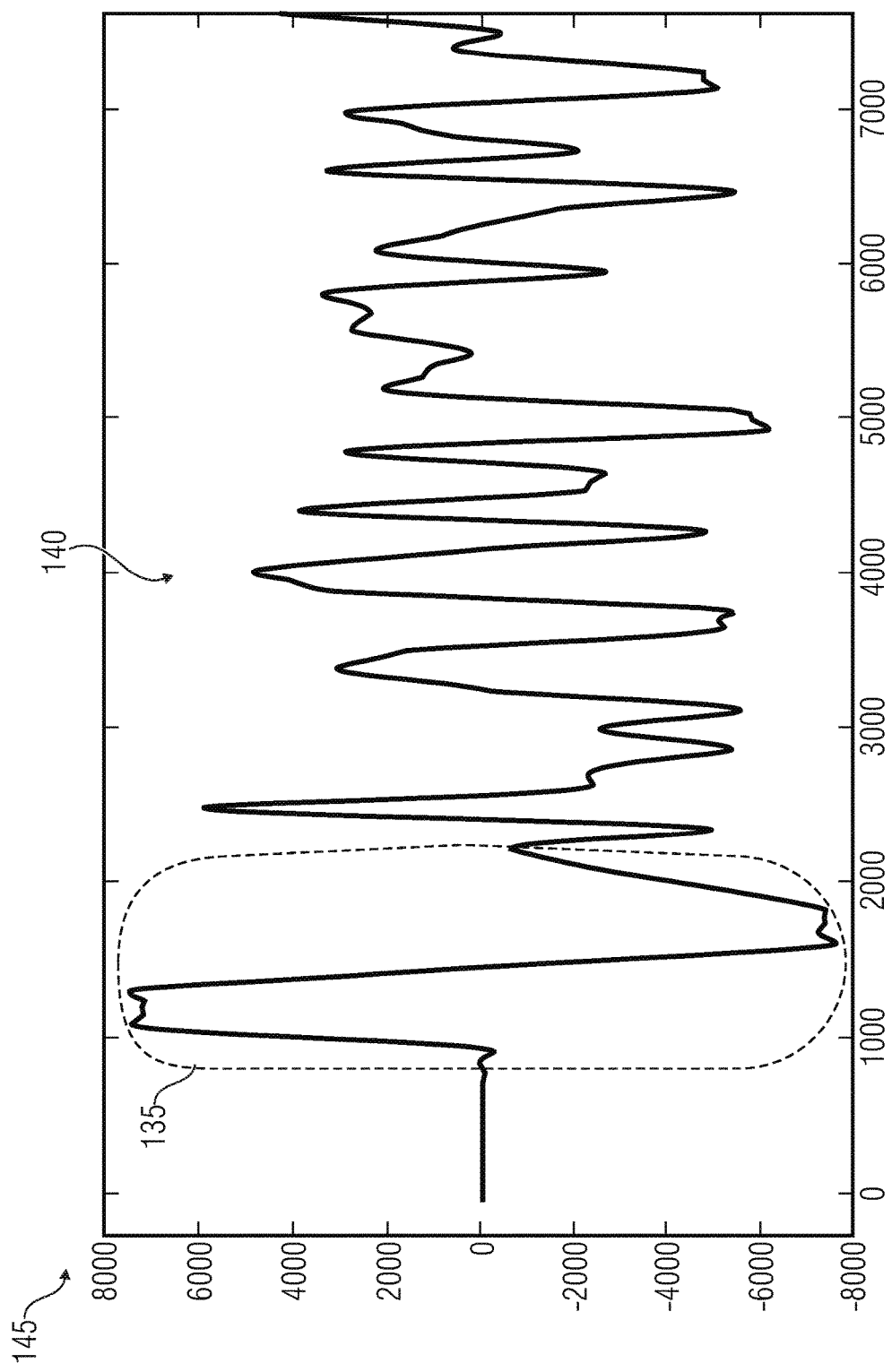

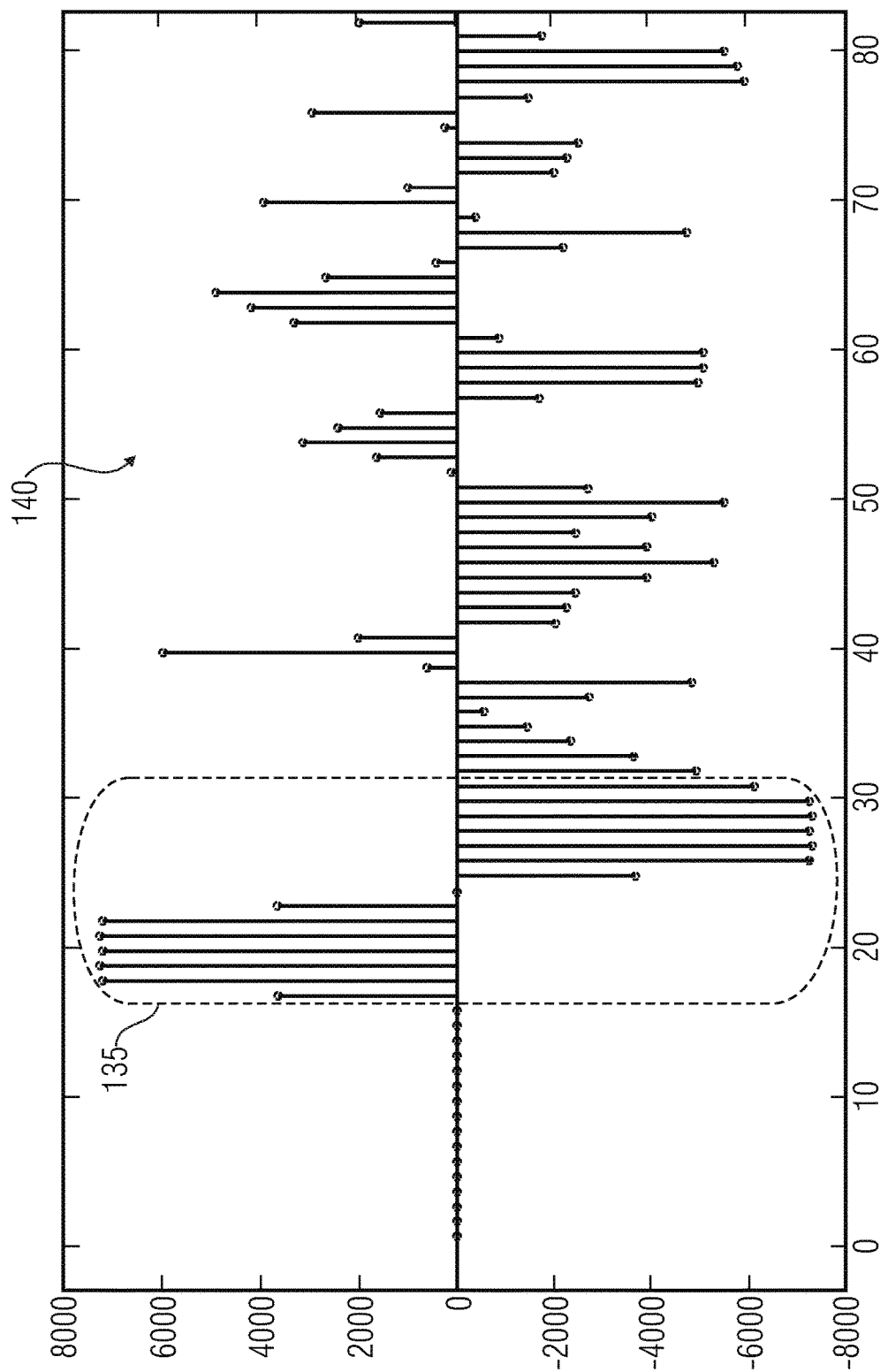

DECODER FOR DECODING A MEDIA SIGNAL AND ENCODER FOR ENCODING SECONDARY MEDIA DATA COMPRISING METADATA OR CONTROL DATA FOR PRIMARY MEDIA DATA

CROSS-REFERENCE TO RELATED APPLICATIONS

This application is a continuation of copending International Application No. PCT/EP2015/075987, filed Nov. 6, 2015, which is incorporated herein by reference in its entirety, and additionally claims priority from European Applications Nos. EP 14 192 907.5, filed Nov. 12, 2014, EP 15 163 198.3, filed Apr. 10, 2015 and EP 15 181 428.2, filed Aug. 18, 2015, all of which are incorporated herein by reference in their entirety.

BACKGROUND OF THE INVENTION

The present invention relates to a decoder for decoding a media signal and an encoder for encoding secondary media data comprising metadata or control data for primary media data.

In other words, the present invention shows a method and an apparatus for distribution of control data or metadata over a digital audio channel. An embodiment shows the convenient and reliable transmission of control data or metadata to accompany an audio signal, particularly in television plants, systems, or networks using standard AES3 (AES: audio engineering society) PCM (pulse code modulation) audio bitstreams embedded in HD-SDI (high definition serial digital interface) video signals.

In the production and transmission of music, video, and other multimedia content, the reproduction of the content can be enhanced or made more useful or valuable by including metadata describing characteristics of the content. For example, music encoded in the MP3 format has been made more useful by including ID3 tags in the MP3 file to provide information about the title or artist of the content.

In video content, it is common to include not only descriptive metadata, but data for controlling the reproduction of the content depending on the consumer's equipment and environment. For example, television broadcasts and video discs such as DVD and Blu-ray include dynamic range control data that are used to modify the loudness range of the content and downmix gains that are used to control the conversion of a surround sound multichannel audio signal for reproduction on a stereo device. In the case of dynamic range control data, gains are sent for each few milliseconds of content in order to compress the dynamic range of the content for playback in a noisy environment or where a smaller range of loudness in the program is advantageous, by optionally multiplying the final audio signal by the gains.

The means of inclusion of such metadata or control data in a digital bitstream or file for delivery to consumers is well established and specified in audio coding standards such as ATSC A/52 (standardized in Advanced Television Systems Committee, Inc. Audio Compression Standard A/52) or MPEG HE-AAC (standardized in ISO/IEC 14496-3 and ETSI TS 101 154).

However, the transmission of metadata or control data in the professional or creative environment, before the content is encoded into a final bitstream, is much less standardized. Until now this information has been primarily static in nature, remaining constant over the duration of the content. Although, loudness control gains are dynamic, in content production standard "encoding profiles" may be established to control the generation of the gains during the final audio encoding process. In this manner, no dynamic metadata may be recorded or transmitted in the content creation environment.

The development of object-oriented audio systems, where sounds in two or three dimensions are described not by levels in traditional speaker channels or Ambisonic components, but by spatial coordinates or other data describing their position and size, now involves the transmission of dynamic metadata that changes continuously, if such sounds move over time. Also, static objects are used to allow the creation of content with disparate additional audio elements, such as alternate languages, audio description for the visually impaired, or home or away team commentary for sporting events. Content with such static objects no longer fits into a uniform model of channels, such as stereo or 5.1 surround, which professional facilities are currently designed to accommodate. Thus, descriptive metadata may accompany each item of content during production or distribution so that the metadata may be encoded into the audio bitstreams for emission or delivery to the consumer.

Ideally, professional content formats would simply include provisions for such position or descriptive metadata in their structure or schema. Indeed, new formats or extensions to existing formats, such as MDA or BWF-ADM have been developed for this purpose. However, such formats are not understood in most cases by legacy equipment, particularly for distribution in systems designed for live or real-time use.

In such systems, legacy standards such as AES 3, MADI, or embedded audio over SDI are common. The use of these standards is gradually being augmented or replaced by IP-based standards such as Ravenna, Dante, or AES 67. All of these standards or techniques are designed to transmit channels of PCM audio and make no provisions for sending dynamic or descriptive metadata.

One technique considered for solving this problem was to encode the audio in a "mezzanine" format using transparent-bitrate audio coding so an appropriately formatted digital bitstream also containing static metadata could be included. This bitstream was then formatted such that it could be sent as PCM coded audio data over the traditional television plant or professional infrastructure. A common implementation of this technique in the television industry is the Dolby E system, carried in a PCM AES3 audio channel according to SMPTE standard ST 337.

Dolby E allowed legacy equipment designed with four PCM audio channels to be used for the 5.1 channels needed for surround sound, and also include provisions for transmitting the "dialnorm" or integrated loudness value of the program.

Use of the Dolby E system revealed several operational shortcomings: One issue was the inclusion of sample rate conversion in many devices used to embed the PCM audio signals in the SDI infrastructure of production or distribution facilities. Sample rate conversion or resampling of the audio signal is commonly performed to insure correct phase and frequency synchronization of the audio data sampling clock with that of the video sampling clock and video synchronization signals used in the facility. Such resampling has a normally inaudible effect on a PCM audio signal, but changes the PCM sample values. Thus, an audio channel used for transmitting a Dolby E bitstream would have the bitstream corrupted by resampling.

In such cases, the resampling may be disabled and other means used to insure synchronism of the sample clocks within the facility.

Another issue was the delay introduced by the block-transform nature of the audio codec employed. The Dolby E codec used one video frame (approximately 1/30 second for interlaced ATSC video) for encoding and one video frame for decoding the signal, resulting in a two-frame delay of the audio relative to the video. This involves delaying the video signal to maintain lip-sync, introducing additional delay in the distribution infrastructure.

A third issue is the need to program SDI routing switchers to treat inputs carrying Dolby E bitstreams as data channels instead of audio signals. Although Dolby E contains a "guard band" around the video signal's vertical interval to allow routing switchers to switch to another input without loss of the Dolby E data, many routing switchers perform a cross-fade of the audio signals during such a switch to prevent audible pops or transients in normal PCM audio signals. These crossfades are of 5-20 ms in duration and corrupt the Dolby E bitstream around the switch point.

These operational limitations resulted in most TV facilities abandoning the use of Dolby E in favor of a strategy of normalizing the dialnorm level of all content upon ingest to their network, so that fixed dialnorm values and dynamic range profiles could be programmed into their emission audio encoders.

An alternative technique sometimes used in TV facilities is to insert metadata information into the SDI video signal itself in the VANC data as standardized in SMPTE standard ST 2020. Often this is combined with carriage of the metadata using the user bits of AES3. However, ordinary SDI embedding equipment does not support the extraction of this metadata from the AES stream for insertion into VANC bits.

An additional technique sometimes used is to encode dynamic control data within a PCM audio signal by inserting it into the LSBs of the audio signal. Such a technique is described in the paper "A Variable-Bit-Rate Buried-Data Channel for Compact Disc" by Oomen and has been employed in implementations of the MPEG Surround audio coding standard. However, such buried data does not survive sample rate conversion or truncation of the LSB.

A related technique is to use extra bits such as User Bits or Auxiliary Sample Bits specified in the AES3 standard as a side data channel suitable for dynamic control data. Unfortunately, many implementations of the AES3 standard discard this information.

A further limitation of the aforementioned techniques is they are intended for use in only in a technical transmission environment. If they were routed through creative equipment, such as an audio console or digital audio workstation, even if no operations were performed on the containing PCM channel, it could not be guaranteed that the data path through the console was bit-exact, as such equipment is not designed for such purposes. Even if such bit-exactness could be assured, the mere accident of touching a control fader and thus inducing a slight gain change in the PCM channel, would corrupt the signal.

Common to all these techniques are the limitations imposed by creation and transport equipment that is designed solely for the purpose of carrying PCM audio signals, without consideration for the embedding of digital control data.

Therefore, there is a need for an improved approach.

SUMMARY

According to an embodiment, an encoder for encoding secondary media data including metadata or control data for primary media data may have: a grouper configured for grouping a bitstream of secondary media data to form grouped secondary media data, representing data words; a reference signal generator for generating a reference pattern indicating a reference amplitude or a predetermined timing instant in the primary media data; a stream builder including a filter to low-pass filter the data words and the reference pattern to obtain data pulses having a length of more than one sample of a predetermined sample rate, wherein an amplitude of a data pulse is weighted according to the grouped secondary media data or the data words, and wherein the filter is configured to add up consecutive weighted data pulses at instants of the predetermined sample rate to obtain the stream of digital words; wherein the encoder is configured to output the stream of digital words Another embodiment may have a decoder for decoding a media signal including a received stream of digital words representing encoded secondary media data including metadata or control data for primary media data and a reference pattern indicating a reference amplitude or a predetermined timing instant in the primary media data; wherein the decoder is configured to recover the secondary media data, wherein the recovering includes analyzing the reference pattern to calculate and compensate an amplification or attenuation or a DC offset applied to the stream of digital words; or converting a sample rate associated with the digital words, according to the predetermined timing instant of the primary media data indicated in the reference pattern, to a predetermined sample rate, to obtain recovered secondary media data, wherein the decoder is configured to derive a bitstream from the recovered secondary media data.

According to another embodiment, a media signal may have: a stream of digital words representing encoded secondary media data including metadata or control data for primary media data and a reference pattern indicating a reference amplitude or a predetermined timing instant in the primary media data; the stream of digital words including data pulses including low-pass filtered data words or a reference patter, the data pulses having a length of more than one sample of a predetermined sample rate, wherein an amplitude of a data pulse is weighted according to the data word or the reference pattern, and wherein the filter is configured to add up consecutive weighted data pulses at instants of the predetermined sample rate to obtain the stream of digital words.

According to another embodiment, a method for decoding a media signal including a received stream of digital words representing encoded secondary media data including metadata or control data for primary media data and a timing reference pattern indicating a timing instant in the primary media data may have the steps of: recovering the secondary media data, wherein the recovering includes: analyzing the reference pattern to calculate and compensate an amplification or attenuation or a DC offset applied to the stream of digital words or converting a sample rate associated with the digital words, according to the predetermined timing instant of the primary media data indicated in the reference pattern, to a predetermined sample rate to obtain recovered secondary media data; and deriving a bitstream from the recovered secondary media data.

According to another embodiment, a method for encoding secondary media data including metadata or control data for primary media data may have the steps of: grouping a bitstream of secondary media data to form grouped secondary media data, representing data words; generating a reference pattern indicating a reference amplitude or a predetermined timing instant in the primary media data; low-pass filtering the data words and the reference pattern to obtain data pulses having a length of more than one sample of a predetermined sample rate, wherein an amplitude of a data pulse is weighted according to the grouped secondary media data or data words, and wherein the filter is configured to add up consecutive weighted data pulses at instants of the predetermined sample rate to obtain the stream of digital words, outputting the encoded secondary media data as the stream of digital words.

Another embodiment may have a non-transitory digital storage medium having a computer program stored thereon to perform the method for decoding a media signal including a received stream of digital words representing encoded secondary media data including metadata or control data for primary media data and a timing reference pattern indicating a timing instant in the primary media data, the method having the steps of: recovering the secondary media data, wherein the recovering includes: analyzing the reference pattern to calculate and compensate an amplification or attenuation or a DC offset applied to the stream of digital words, or converting a sample rate associated with the digital words, according to the predetermined timing instant of the primary media data indicated in the reference pattern, to a predetermined sample rate, to obtain recovered secondary media data; and deriving a bitstream from the recovered secondary media data, when said computer program is run by a computer.

Another embodiment may have a non-transitory digital storage medium having a computer program stored thereon to perform the method for encoding secondary media data including metadata or control data for primary media data, the method having the steps of: grouping a bitstream of secondary media data to form grouped secondary media data, representing data words; generating a reference pattern indicating a reference amplitude or a predetermined timing instant in the primary media data; low-pass filtering the data words and the reference pattern to obtain data pulses having a length of more than one sample of a predetermined sample rate, wherein an amplitude of a data pulse is weighted according to the grouped secondary media data or data words, and wherein the filter is configured to add up consecutive weighted data pulses at instants of the predetermined sample rate to obtain the stream of digital words, outputting the encoded secondary media data as the stream of digital words, when said computer program is run by a computer.

According to another embodiment, a data processing system may have: an encoder as mentioned above; and a decoder for decoding a media signal including a received stream of digital words representing encoded secondary media data including metadata or control data for primary media data and a reference pattern indicating a reference amplitude or a predetermined timing instant in the primary media data; wherein the decoder is configured to recover the secondary media data, wherein the recovering includes analyzing the reference pattern to calculate and compensate an amplification or attenuation or a DC offset applied to the stream of digital words; or converting a sample rate associated with the digital words, according to the predetermined timing instant of the primary media data indicated in the reference pattern, to a predetermined sample rate, to obtain recovered secondary media data, wherein the decoder is configured to derive a bitstream from the recovered secondary media data.

The present invention is based on the finding that secondary media data, for example metadata carrying further information of the content of a first media signal (e.g. payload data) or control data comprising data to control the reproduction of the content of the first media data, may be arranged in a stream of digital words that is robust against a significant variety of signal manipulations. Embodiments show the stream of digital words as an audio-like digital signal being able to withstand or to be robust against signal manipulation which is typical for audio signals. The signal processing might be a transformation of the sampling frequency, an amplification or attenuation of the signal or a DC (direct current) offset. The transformation of the sampling frequency may be performed e.g. if the stream of digital words is arranged in a higher order stream such as e.g. an AES3 PCM digital audio channel, where a sampling frequency of the encoder creating the stream of digital words is different from a sampling frequency of a signal processor, such as an AES3 digital audio interface, creating the higher order stream. Therefore, the secondary media data can be treated as a typical audio signal and may be therefore implemented in one of multiple audio channels in present systems, for example in special hardware in television (TV) studios. A special embodiment might be an SDI video signal containing 16 audio channels, where one audio channel is used for metadata or control data. The SDI video signal may also contain one or more video channels. The audio channels may be PCM digital audio channels. Therefore, the metadata or control data may be encoded as a robust analog-like digital signal instead of a standard digital bitstream, to be robust against signal manipulation typical for PCM digital audio channels. Present systems may be extended to comprise control data or metadata by replacing current encoders and decoders with encoders and decoders described below. This replacement can be achieved by a comparably inexpensive software update. Even if the encoder and decoder are realized in hardware, further (expensive) hardware such as broadcast equipment can remain unchanged.

Embodiments show an encoder for encoding secondary media data comprising metadata or control data for primary media data. The encoder is configured to encode the secondary media data to obtain a stream of digital words, the encoding comprising transforming the secondary media data by a digital modulation or comprising bandlimiting. Moreover, the encoder is configured to output the encoded secondary media data as a stream of digital words. Therefore, the stream of digital words may be formed such that it is able to resist a typical processing of a digital audio stream. Furthermore, means for processing a digital audio stream are able to process the stream of digital words, since the stream of digital words may be designed as an audio-like or analog-like digital stream.

Embodiments relate to the encoding. The encoding may comprise adding redundancy by the digital modulation. The digital modulation, e.g. a pulse amplitude modulation, may be so that two or more bits of the secondary media data are transmitted per digital word of the stream of digital words. Moreover, the encoder may output the stream of digital words so that the stream of digital words is transmittable over a PCM audio channel. Furthermore, the encoder might output a further stream of digital words. The further stream of digital words represents the primary media data and the further stream is separated from the stream of digital words.

The primary media data may be audio data and the secondary media data could be metadata for the audio data or control data for the audio data. Therefore, the encoder may be configured to output the stream of digital words and the further stream of digital words so that the further stream of digital words is transmittable over a first audio PCM channel and so that the stream of digital words is transmittable over a second audio PCM channel being different from the first audio PCM channel. Each of the digital words of the further stream representing the primary media data might have a predefined number of bits being greater than 8 bits and smaller than 32 bits, and wherein each of the digital words of the stream of digital words may have the predetermined number of bits as well. The encoder may further generate the stream of digital words so that the stream of digital words comprises a timing reference pattern or an amplitude reference pattern.

Further embodiments show an alignment of the secondary media data. Therefore, the encoder outputs a video stream representing a sequence of video images, so that the control data or meta data of the secondary media data related to a certain video image are related to the certain video image. This is advantageous, since the sequence of video images may be cut at any video image or between any of consecutive video images and the following video image still comprises the control data or meta data related to this video image. Furthermore, the encoder may output the stream of digital words as a first stream of digital words associated to a first video image of the sequence of video images, and to output the stream of digital words as a second stream of digital words associated to a second video image of the sequence of video images, wherein the first and second digital words are identical to each other. This may be advantageous, if consecutive video images comprise identical metadata or control data, to ensure that each video image comprises the metadata or control data referring to the video image.

Moreover, embodiments show the encoder to output the encoded secondary media data as the stream of digital words as a control track and to output up to 15 channels of the primary media data as audio tracks, wherein the control track and the audio tracks are formed in accordance with the AES 3 standard.

Further embodiments show the encoder being configured to generate the digital words, the digital words having 12 to 28 bits, or wherein the digital words are sampled at a sampling rate of between 30 kHz to 55 kHz, or wherein the digital words have a dynamic range of 70 to 160 dB, or have a nominal signal level of −20 dB RMS full scale. The encoder may use an upper frequency for bandlimiting the secondary media data being between 15 kHz to 27.5 kHz for a sampling rate between 30 kHz to 55 kHz.

Embodiments further show the encoder comprising a mapper and a stream builder. The mapper is configured for mapping the grouped secondary media data comprising a first number of bits into a data word comprising a second number of bits being greater than the first number of bits. Furthermore, the grouped secondary media data is aligned with a gap to a most significant bit or a least significant bit of the data word. The stream builder is configured for building a stream representing the encoded secondary media data using a reference pattern and a plurality of data words. This is advantageous, since the gap enables an amplification of the grouped secondary media data by about 6 dB (or with a factor of 2) for each bit the gap comprises to the most significant bit and an attenuation of about 6 dB (or with a factor of 0.5) for each bit the gap comprises to the least significant bit of the data word. Therefore, it does not matter whether the amplification or attenuation is applied on purpose or accidentally, since the structure of the data word, with the mapping of the grouped secondary media data (information) to the data word, where at both ends of the grouped secondary media data padding is applied to obtain the data word, enables bit shifting (amplification by factor 2 for each bit shifted to the most significant bit or attenuation by factor 0.5 for each bit shifted to the least significant bit). Therefore, the grouped secondary media data is not corrupted and remains valid until the amplification or attenuation is greater than the padding.

Embodiments further show the encoder comprising a grouper for grouping a bitstream of secondary media data to form grouped secondary media data. Moreover, the encoder may comprise a reference signal generator for generating a reference pattern indicating a reference amplitude or a predetermined timing instant in the primary media data. The stream builder may build a stream of digital words representing encoded secondary media data using the reference pattern or the data word. The reference pattern may indicate a reference amplitude or a predetermined timing instant in the primary media data. An analysis of the reference pattern in a decoder enables the decoder to calculate an amplification or attenuation or a DC offset applied to the stream of digital words after the stream was encoded in the encoder. Furthermore, a sampling rate of the stream of digital words may be determined from the predetermined timing instant in the primary media data.

The stream builder may further comprise a filter to low-pass filter the data words or the reference pattern to obtain digital words comprising a length of more than one sample of a predetermined sample rate, wherein an amplitude of the digital word is weighted according to the data word or the reference pattern, and wherein the filter is configured to add up consecutive digital words at instants of the predetermined sample rate to obtain the stream of digital words. Applying the filter is advantageous, since the secondary media data is more vulnerable to a resampling than normal audio data. Therefore, the filter enables the secondary media data to withstand applied resampling steps between the encoder and the decoder or in the decoder with respect to the encoder, and to withstand the resampling step that may be used, in the decoder period. Moreover, the stream of digital words may be analog and again digital converted during resampling without considerable loss. However, resampling may not be the same as converting a digital signal to an analog signal. Analog conversion may involve filters with impulse responses that would smear the data, and the analog-to-digital conversion might add quantizing noise to the signal, as well as any analog noise (thermal or semiconductor generated noise, hum or interference, etc). A signal which is generated using the inventive concept is able to withstand a resampling and an digital-to-analog conversion.

According to further embodiments, the filter is configured to obtain zero points at instants of a predetermined sample rate of a data pulse, wherein a data pulse comprises a data word comprising grouped secondary media data or the reference pattern. Furthermore, the stream builder is configured to build the stream representing the encoded secondary media data using the reference pattern and a plurality of data words such that zero points of the data pulse are aligned with a maximum of a further data pulse to obtain an inter-symbol-interference-free stream representing the encoded secondary media data. In other words, it is advantageous to use a Nyquist filter, since a Nyquist-filtered signal may be decoded in the decoder without inter-symbol-interference. In other words, it is advantageous to use a filter satisfying the Nyquist criterion for zero inter-symbol interference. According to embodiments, the cutoff frequency of the filter may be less than 1.5 times of a sampling frequency of the primary media data.

According to an embodiment, the reference signal generator generates a grouped reference pattern comprising a first number of bits. The reference signal generator is further configured to map the grouped reference pattern into a data word comprising a second number of bits being greater than the first number of bits. Alternatively, the mapper maps a grouped reference pattern comprising a first number of bits into a data word comprising a second number of bits being greater than the first number of bits. The embodiments describe options to apply the format of the data words comprising metadata or control data to the reference pattern. Advantageously, the reference pattern obtains the same precautions against amplification or attenuation of the media signal than the secondary media data. Therefore, the reference signal generator may provide the reference pattern in a form of the mapped secondary media data, meaning that the reference pattern comprises a first number of bits and is mapped into a reference pattern comprising a second number of bits being greater than the first number of bits and comprising the same gap to the most significant bit and the least significant bit as already described in the decoder and the encoder. Alternatively, the reference signal generator outputs a reference pattern comprising a first number of bits. In accordance with the secondary media data, the mapper maps the reference pattern with a first number of bits into a data word with a second number of bits.

Embodiments further show a decoder for decoding a media signal comprising a received stream of digital words representing encoded secondary media data comprising metadata or control data for primary media data. The decoder is configured to recover the secondary media data using manipulating the received stream of digital words with respect to amplitudes represented by the received digital words or using resampling. The decoder is configured to derive a bitstream from the recovered secondary media data.

Embodiments further show the decoder comprising a reference signal generator, a signal manipulator, and a signal processor. The reference pattern analyzer analyzes a reference pattern of the encoded secondary media data, wherein the reference pattern analyzer is configured to determine an amplitude of the reference pattern or to determine a predetermined timing instant in the primary media data. The signal manipulator manipulates the encoded secondary media data in accordance with the analyzed reference pattern and a computed reference pattern to obtain secondary media data. The signal processor processes the primary media data according to the encoded secondary media data to obtain a decoded media signal. This is advantageous, since the signal processing applied to the media signal during the encoding enables the signal manipulator to accurately regain the media signal from the encoded media signal, independent from typical signal manipulations like amplification etc.

According to embodiments, the signal manipulator comprises a sample rate converter configured to convert a sample rate associated with the digital words, according to a predetermined timing instant of the primary media data indicated in the reference pattern, to a predetermined sample rate to obtain resampled digital words. This is advantageous, since standards for audio sampling rates may be mixed during processing of the media data. Even a small sample rate conversion from e.g. 48 kHz to 48.1 kHz corrupts the secondary media data since, in contrast to audio data, there is no redundancy or dependency in the secondary media data, which comprises metadata or control data. In other words, consecutive symbols of the secondary media data may vary from the highest possible value to the lowest possible value within one sample. This results in very high frequencies due to the strong changes within the secondary media data.

In contrast to the secondary media data, however, audio samples are typically band-limited, meaning that audio data changes are limited to a maximum frequency determined by the sampling frequency.

Further embodiments describe the reference pattern analyzer comprising a timing instant determiner configured to determine the predefined timing instant of the primary media data in the reference pattern in terms of samples of a sample rate, an upsampler configured to upsample a range around the determined timing instant to determine an exact position of a predetermined timing instant, and a sampling accumulator configured to determine an exact position of the digital words within the stream of digital words to obtain an actual sample rate associated to the digital words being different from a predetermined sample rate.

Embodiments further show the reference pattern analyzer comprising a gain factor calculator configured to calculate an amplification or attenuation factor according to the amplitude or the reference pattern and the amplitude of the computed reference pattern and wherein the signal manipulator comprises a multiplier configured to amplify or attenuate the data words according to the amplification or attenuation factor to obtain gain compensated data words. This is advantageous, since an amplification or attenuation of the encoded media signal is one of the main issues which may be caused during transfer of an encoder to the decoder. It may be applied on purpose, for example in an equalizer, if other audio channels should be amplified or attenuated on purpose or accidentally due to a channel with the above mentioned characteristics.

According to a further embodiment, a media signal comprising a stream of digital words is shown. The stream of digital words represents secondary media data comprising metadata and control data for primary media data.

Further embodiments show the reference pattern analyzer comprising an amplitude detector configured to determine the amplitude of the reference pattern and a further amplitude of the reference pattern. The reference pattern analyzer may further comprise an offset compensation unit configured to calculate an offset of the encoded secondary media data according to a drift of the amplitude of the reference pattern and the further amplitude of the reference pattern and wherein the second manipulator comprises an adder configured to add the calculated offset of the encoded secondary media data from the encoded secondary media data to obtain offset compensated encoded secondary media data. The advantages of the embodiment are similar to those of the previous embodiment of the gain factor calculator, where an offset may be applied to the encoded secondary media data instead of a gain, e.g. during an equalization process between the encoder and the decoder, or accidentally from a drift caused by the transmission channel.

Embodiments further show the signal manipulator comprising a demapper configured to demap grouped secondary media data comprising a first number of bits from the data words comprising a second number of bits being greater than the first number of bits. Additionally or alternatively, the signal manipulator comprises an ungrouper configured to ungroup grouped secondary media data comprising a first number of bits to obtain a decoded media data bitstream. The digital words may further comprise the digital words comprising filtered secondary media data comprising a reference pattern and a plurality of data words, wherein the secondary media data is mapped into data words with a gap to the most significant bit of the data word or the least significant bit of the data word. Moreover, the reference pattern may comprise a reference amplitude of the encoded secondary media data and a predetermined timing instant in primary media data and wherein the plurality of data words comprise secondary media data.

Embodiments show the media signal comprising a further stream of the primary media data, wherein the primary media data comprises audio data or video data, wherein the further stream comprising primary media data is aligned to the stream of encoded secondary media data and the predetermined timing instant in the primary media data. This is advantageous, since the timing instant in the primary media data allows an accurate alignment of the secondary media data to the primary media data. In other words, an audio signal and metadata or control data may be aligned to frames of a video signal at a vertical blanking or a further synchronization signal of the video signal. Furthermore, the timing instant may be a synchronization signal in an audio signal, where the secondary media data is aligned to. Therefore, the secondary media data may be also applied to audio-only streams. The idea is to provide any information of the secondary media data within each frame of the video signal. Since the secondary media data is aligned to the time instant in the primary media data where the video stream is cut, the secondary media data remains unchanged and is intact. Therefore, each video frame may contain any information from the secondary media data even if the video signal comprising the video frame is cut.

Embodiments may be developed according to the following considerations. Therefore, it is an advantage of embodiments of the invention to provide a means for carrying static and dynamic control data or metadata accompanying PCM (pulse code modulation) digital audio signals through traditional creative and distribution equipment which only provides PCM audio channels.

This may be accomplished by considering the PCM digital audio channel's fundamental nature as a transmission means for an audio signal. Such audio signals are normally digitized for television use at a bit-depth of 16 to 24 bits and at a sampling rate of 48 kHz and have a resulting dynamic range of 90 to 140 dB, with a nominal signal level of −20 dB RMS (root mean squared) full scale.

Thus, if one considers the typical AES3 transmission channel as a digitized communication channel having these characteristics, the modulation techniques commonly employed in digital communications may be used to send modulated data over the channel. Such techniques are naturally immune to gain changes, moderate time base distortions, and in many cases, frequency response distortions of the channel.

The AES3 PCM digital audio channel differs from the channels used for digital communication. It is strictly a digital channel, and does not suffer from the multipath and rapid channel fading typical of radio communications channels. Given the 90 to 140 dB dynamic range, it is not practically limited in potential transmit power to provide sufficient carrier to noise ratio. When used in video systems, such as embedded in the SDI (serial digital interface) video signal, it has an inherent block nature due to the need to avoid the video vertical sync interval where switching can occur. Also, unlike many communications systems, there is a need for low latency, to avoid lip-sync issues or to avoid difficulties in monitoring audio when producing live broadcasts.

The throughput requirements of the control data or metadata needed for object audio vary by the number of objects, whether they are static or dynamic, and the particular object audio standard employed. One such standard is the MPEG-H Audio specification, ISO/IEC 23008-3. In this standard, typical use cases involve metadata or control data being encoded in streaming packets using the MHAS (MPEG-H Audio Stream (defined in ISO/IEC 23008-3 in Chapter 14 "MPEG-H 3D audio stream")) specification at bitrates of 10-30 kb/s.

For example, each dynamic object in a MPEG-H audio scene may use 1.5 kb/s for transmission. Thus, a program with 16 dynamic objects (a practical maximum given that the SDI interface only supports 16 channels of embedded audio) may use about 25 kb/s of data. Static metadata regarding the audio scene could take another 40-50 kb/s, if it was sent each audio frame.

The potential bit error rate (BER) needed can be estimated by considering the following factors: If a single bit error were permitted in operation once per year, given a bitrate of 75 kb/s, 2.36E12 bits would be sent in a year, requiring a bit error rate of 4.2E-13. However, the information in the control data is highly redundant. In most cases, bit errors will be detected by the underlying MHAS protocol and the control data would be interpolated from surrounding packets. Additionally or alternatively, CRC (cyclic redundancy check) values, e.g. using 16 bit, or other suitable codes or mechanisms to check for bit errors may be used. In this case, a bit error once per hour might be a reasonable upper limit. This latter case would use a BER of 3.7E-9. Thus, a reasonable BER for this transmission scheme would likely need a BER between 1E-9 and 1E-12, which is easily possible with the high signal to noise ratios available in the AES3 digital audio channel.

It should be noted that the typical expressions for BER for communications channels do not apply here, as the noise in this channel is strictly that of quantization and resampling, with a rectangular or possibly (in the case dither is applied) triangular probability density function.

The time-base error introduced by sample rate conversion (or more precisely, by sources operating asynchronously) is limited by the accuracy of the clock sources employed in each piece of equipment acting as an asynchronous source. Most professional television facilities operate with clock or synchronization signal sources generated from accurate crystal, GPS, or rubidium standards, typically with a maximum frequency tolerance of 0.1 to 1.0 ppm. Typical consumer equipment may have frequency tolerances of 30 ppm. Allowing some margin for the case of consumer equipment operating at temperature extremes, a tolerance of 100 ppm may be safely assumed, for the case of consumer equipment operated in the field being connected to a professional TV plant.

Thus, a possible set of design assumptions and goals for applying this invention for the purpose of transmitting the control data or metadata needed for a common use of the MPEG-H Audio standard are:

| | |
|---|---|
| Sampling Frequency | 48 kHz |
| Symbol Frequency | 16 kbaud (⅓ sample rate for convenience) |
| Desired bitrate | 75 kb/s |

| | |
|---|---|
| Maximum latency, end to end | 240 samples or 5 ms |
| Maximum time-base error | 100 ppm |
| Channel Bit Depth | 14 bits (allowing for poor rounding, extra quantizing noise in poor digital audio equipment design, etc.) |
| Channel Gain | +15 to −20 dB (to allow for gain errors in equipment, or inadvertent adjustment of a channel gain in processing equipment or an audio console or workstation) |
| Nominal RMS or loudness value of signal | −30 to −15 dB FS (to allow operational personnel to monitor the signal level of the audio channel as they would for normal audio signals) |

A further goal of a embodiment of this invention is to allow ease of implementation and debugging by audio coding engineers, who are very familiar with the building blocks used in perceptual audio coding, but who may not have experience with the implementation techniques common to data communications.

Given the channel bandwidth of 24 kHz, and design symbol rate of 16 kbaud, simple classical modulation techniques such as ASK or PSK will not be adequate. Modulation that provides coding efficiency of at least 5 b/s/Hz will be used.

Those skilled in the art will realize that a number of commonly used modulation techniques for digital communications would satisfy these design assumptions and goals. For example, 64 QAM (Quadrature Amplitude Modulation with an alphabet of 64 symbols) could be used, as it provides a coding efficiency of 6 b/s/Hz. However, implementing a QAM demodulator generally uses moderately complex signal processing to recover the carrier frequency and symbol clock, including the use of digital phase lock loops (PLL) which are unfamiliar to audio coding engineers. Such PLLs involve tuning of loop filters or accumulators to avoid loop instability, and may need some time to stably acquire the signal after a transient or switch.

The embodiment presented here uses 32 PAM (Pulse Amplitude Modulation with 32 levels) as an alternative that does not involve PLLs and produces a design that uses signal processing functions commonly employed in audio coding. PAM involves a 6 dB increase in signal to noise ratio for each increment of coding efficiency compare to the 3 dB needed with QAM, but in this system the signal to noise ratio is inherently high, while the design and debugging costs of a PAM receiver are lower.

All of the previously described embodiments may be seen in total or in combination, for example in a television plant where the encoder encodes a video signal with a corresponding audio signal and metadata or control data (secondary media data), for example at a first sampling frequency and wherein the decoder may be applied to a control instance (e.g. monitoring unit) or an emission instance before transmission of the media signal to a consumer.

BRIEF DESCRIPTION OF THE DRAWINGS

Embodiments of the present invention will be discussed subsequently referring to the enclosed drawings, in which:

FIG. 2 shows a schematic block diagram of an encoder for encoding secondary media data according to an embodiment;

FIG. 3 shows a schematic block diagram of an encoder for encoding secondary media data according to a further embodiment;

FIG. 8b shows a schematic representation of a media signal according to a further embodiment;

FIG. 10b shows a raised cosine shape filter with a rolloff factor of 0.98 in a time-discrete representation;

FIG. 11a shows the raised cosine shape filter function with a rolloff factor of 0.7 in a time-continuous representation;

FIG. 11b shows the raised cosine shape filter function with a rolloff factor of 0.7 in a time-discrete representation;

FIG. 12a shows a schematic representation of a stream according to an embodiment in a time-continuous representation according to an embodiment;

FIG. 12b shows a part of the stream already presented in FIG. 12a in an enlarged version;

FIG. 12d shows a part of the stream already presented in FIG. 12a in an enlarged version;

FIG. 15a-1 and FIG. 15a-2 show a schematic representation of a system in a fixed mode; and FIG. 15b-1 and FIG. 15b-2 show a schematic representation of the system in a Control Track Mode.

DETAILED DESCRIPTION OF THE INVENTION

In the following, embodiments of the invention will be described in further detail. Elements shown in the respective figures having the same or a similar functionality will have associated therewith the same reference signs.

Embodiments provide convenient and reliable transport of audio signal metadata or control data accompanying a digital audio signal. The metadata or control data is digitally modulated or encoded into a signal tolerant of typical transmission degradations for distribution in professional audio or video production or distribution facilities and networks over a normal digital audio channel, or the channel is embedded in a digital video signal. Metadata may comprise a description for on-screen displays, position of objects within a video frame, language information for different audio channels such as e.g. German, English, French etc. language. Control data may comprise information regarding a coding of the audio channels in order to apply the correct decoding parameters or control data may comprise parameters to interpret higher order ambisonics or any other information to decode the audio signal. However, metadata and control data may be used for many other purposes. In digital media, essence is the underlying content of an asset, and metadata is descriptive data about that asset. Therefore, the above mentioned examples do not limit the scope of the invention.

Figure 1:
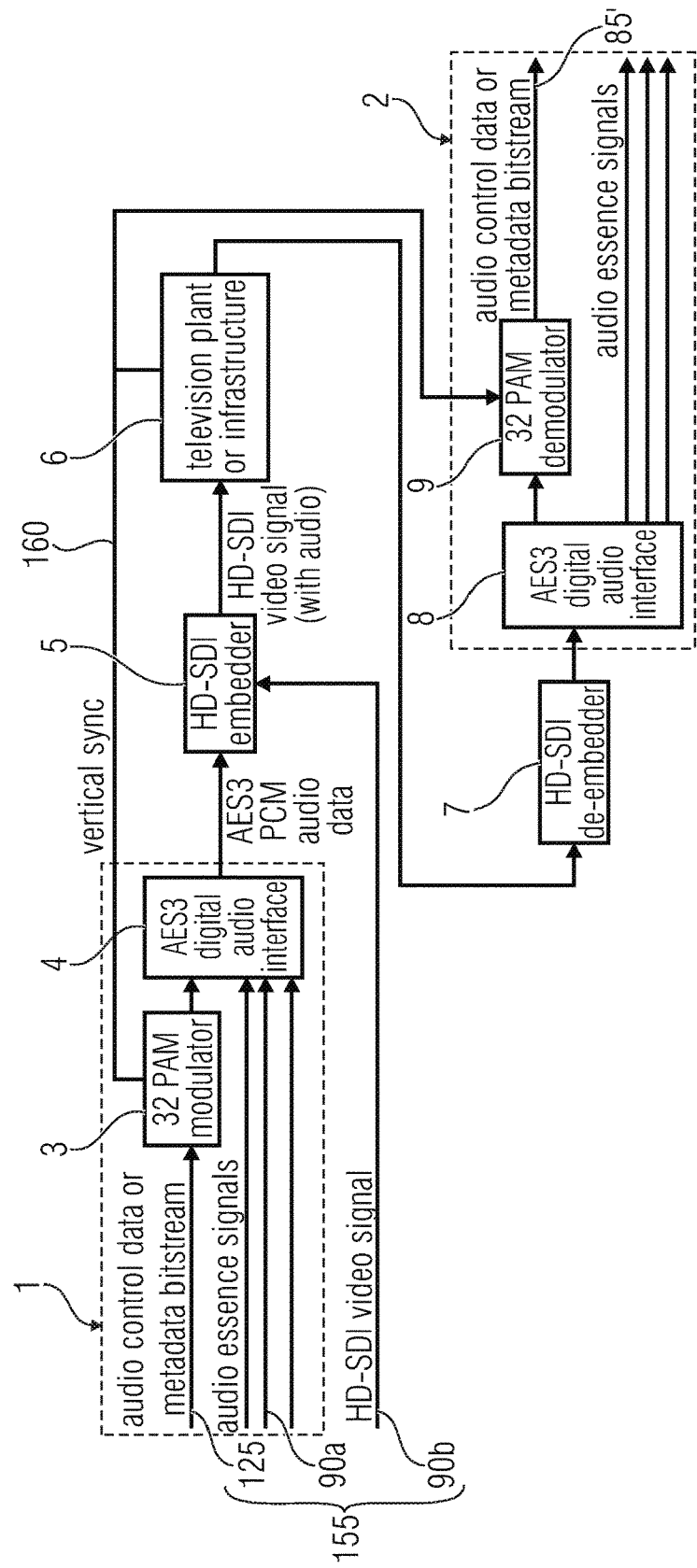
FIG. 1 shows a schematic block diagram of a system of an encoder and a decoder in a television plant or a network according to embodiments.

FIG. 1 shows a schematic block diagram of a data processing system 400 comprising an encoder and a decoder. Specifically, FIG. 1 shows a 32 PAM modulator 3 comprising the encoder and a 32 PAM demodulator 9 comprising the decoder. Furthermore, a media signal 155 comprising a bitstream of secondary media data 125 and primary media data 90a (e.g. audio essence signals) and additionally, the primary media data 90b (e.g. a video signal) are shown according to an embodiment. The system may be part of a TV studio where the secondary media data comprising audio control data or a metadata bitstream is included in the audio essence signals and therefore aligned to the video signal for each video frame. Therefore, in the TV studio, the encoded video signal may be checked using a monitoring unit and therefore using the decoder to decode the encoded media signal. Furthermore, the media signal may be decoded using the secondary media data before channel coding and further processing operations to prepare the final media signal to be transmitted to a consumer. This final media signal does not have the secondary media signal anymore.

More generalized, according to an embodiment, the data processing system comprises a signal manipulator for manipulating the stream of digital words to obtain a manipulated stream of digital words, wherein the decoder is configured to recover the stream of digital words from the manipulated stream of digital words. The signal manipulator may manipulate by amplitude amplification or amplitude attenuation or offset introduction or offset variation or frequency selective attenuation or amplification or resampling. Furthermore, the decoder can recover the stream of digital words manipulated by amplitude amplification or amplitude attenuation or offset introduction or offset variation or frequency selective attenuation or amplification or resampling. Moreover, the signal manipulator can receive a PCM audio channel and may output a PCM audio channel, wherein the encoder is configured to output a signal transmittable over the PCM audio channel, and wherein the decoder is configured to receive the transmitted stream from the PCM audio channel.

In other words, FIG. 1 shows the operation of an embodiment of the invention in the environment of a professional audio or video production or distribution facility or network. Audio peripheral or workstation 1 is a source of one or more digital audio signals, referred to as essence signals (or primary media data) to distinguish them from related control data or metadata signals (secondary media data), which are also sourced by the peripheral or workstation.

The control data or metadata bitstream is input to transmitter 3 which converts it to a form such as 32 PAM modulated PCM samples which will survive normal channel impairments of AES3 or HD-SDI channels. The samples, as well as one or more optional audio essence signals are then supplied to AES3 digital audio interface 4. The output of this interface is embedded in a HD-SDI video signal by embedder 5, which may apply sample rate conversion to align the phase and frequency of the AES3 clock with the clock and sync signals of the HD-SDI video signal. This video signal is then distributed through an SDI-based television plant or infrastructure 6 for delivery to a second audio peripheral or workstation 2. The digital audio signals are extracted from the HD-SDI signal by de-embedder 7 and sent as AES3 bitstreams to AES3 digital audio interface 8. The PCM data corresponding to the AES channel containing the control data or metadata information (encoded secondary media data) is sent to a receiver 9. The receiver 9 comprises the decoder 50, which decodes the 32 PAM or similar modulated signals into the audio control data or metadata bitstream 85', which may be part of the decoded media signal 85. Furthermore, the signal processor 70 shown in FIG. 6 processes the primary media data (audio essence signal) according to the encoded secondary media data to obtain the encoded media signal.

Figures 1, 15A:
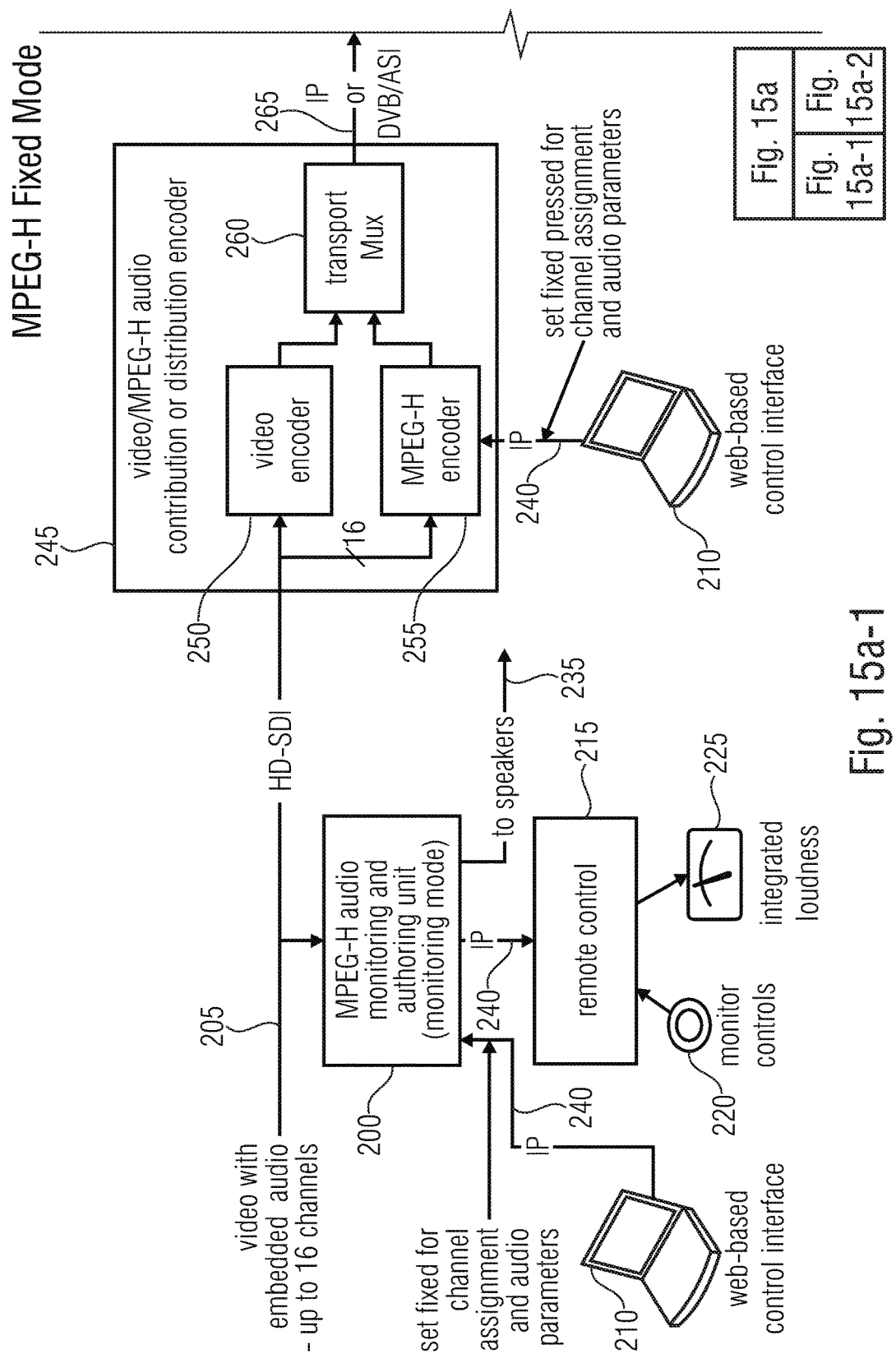
Figures 2, 15A:
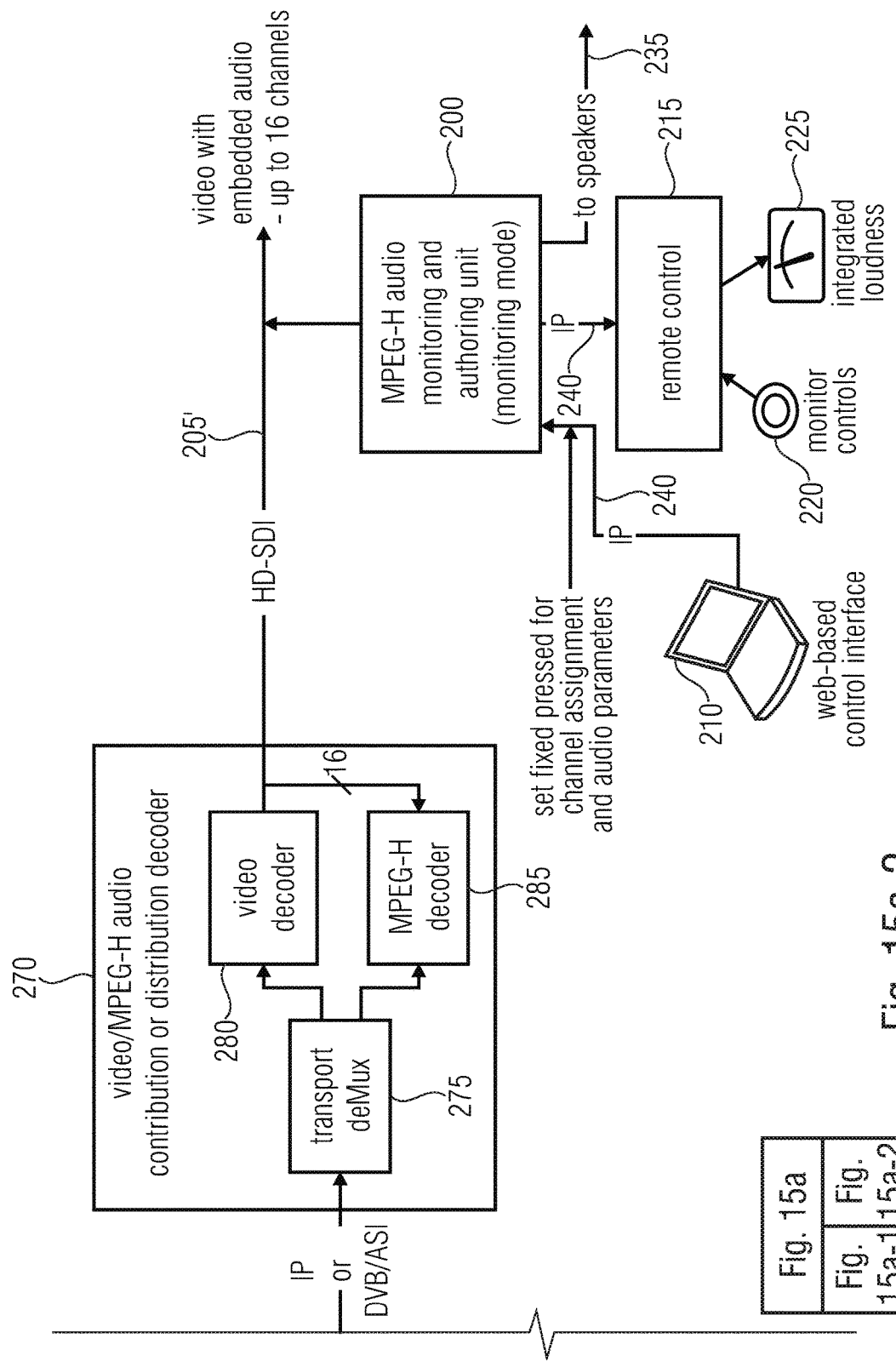

FIG. 2 shows a schematic block diagram of an encoder 100 for encoding secondary media data comprising metadata and control data for primary media data. The encoder is configured to encode the secondary media data 80 using adding redundancy or bandlimiting. The encoder is further configured to output the encoded secondary media data as a stream 145 of digital words. In an embodiment, redundancy may be added to the secondary media data by zero padding or sign-extension. Other embodiments may use checksums or redundancy codes. A further embodiment shows a bandlimited secondary media data or a bandlimited group of secondary media data optionally with or without added redundancy. Bandlimiting may be derived by applying a (low-pass) filter to a signal or more specific, to an outbound signal of the encoder, which may be a grouped or mapped secondary media data. According to further embodiments, the encoder is configured to generate the digital words, the digital words having 12 to 28 bits, or wherein the digital words are sampled at a sampling rate of between 30 kHz to 55 kHz, or wherein the digital words have a dynamic range of 70 to 160 dB, or have a nominal signal level of −20 dB RMS (root mean square) full scale. The encoder may be also configured to use an upper frequency for bandlimiting the secondary media data being between 15 kHz to 27.5 kHz for a sampling rate between 30 kHz to 55 kHz.

FIG. 3 shows a schematic block diagram of an encoder 100 for encoding a media signal. The encoder 100 comprises a mapper 115, and a stream builder 120. The mapper 115 is configured to map a group of grouped secondary media data 130 comprising a first number of bits into a data word 140 comprising a second number of bits being greater than the first number of bits. The grouped secondary media data is aligned with a gap to a most significant bit or a least significant bit of the data word. The stream builder is configured to build a stream of digital words representing encoded secondary media data. According to further embodiments, the encoder comprises a grouper 105 configured for grouping the secondary media data 80, which may be a bitstream of secondary media data, to form grouped secondary media data 130. Moreover, the encoder may comprise a reference signal generator 17 configured to generate a reference pattern indicating a reference amplitude or a predetermined timing instant in the primary media data, wherein a stream builder 120 is configured to build a stream 145 of digital words representing encoded secondary media data 55 using the reference pattern 60 or the data word 140. Therefore, both signals, the reference pattern 135 and the data word 140 may be input to a stream builder 120 configured to build a stream 145 of digital words representing encoded secondary media data.

Figure 4:
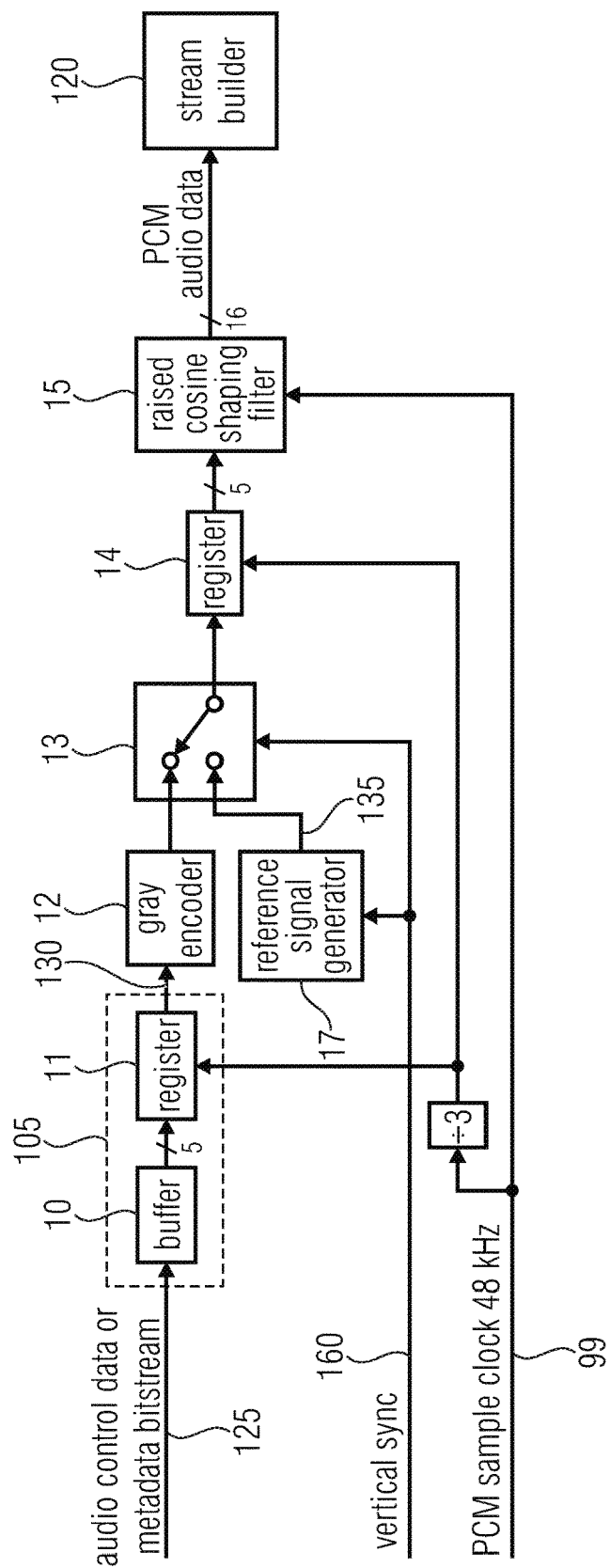
FIG. 4 shows a schematic conceptual block diagram of the transmitter portion of the invention that accepts a metadata or control data bitstream and encodes it as a 32 PAM signal formatted for transmission in a 16 bit, 48 kHz PCM audio channel according to an embodiment.
Figure 11C:
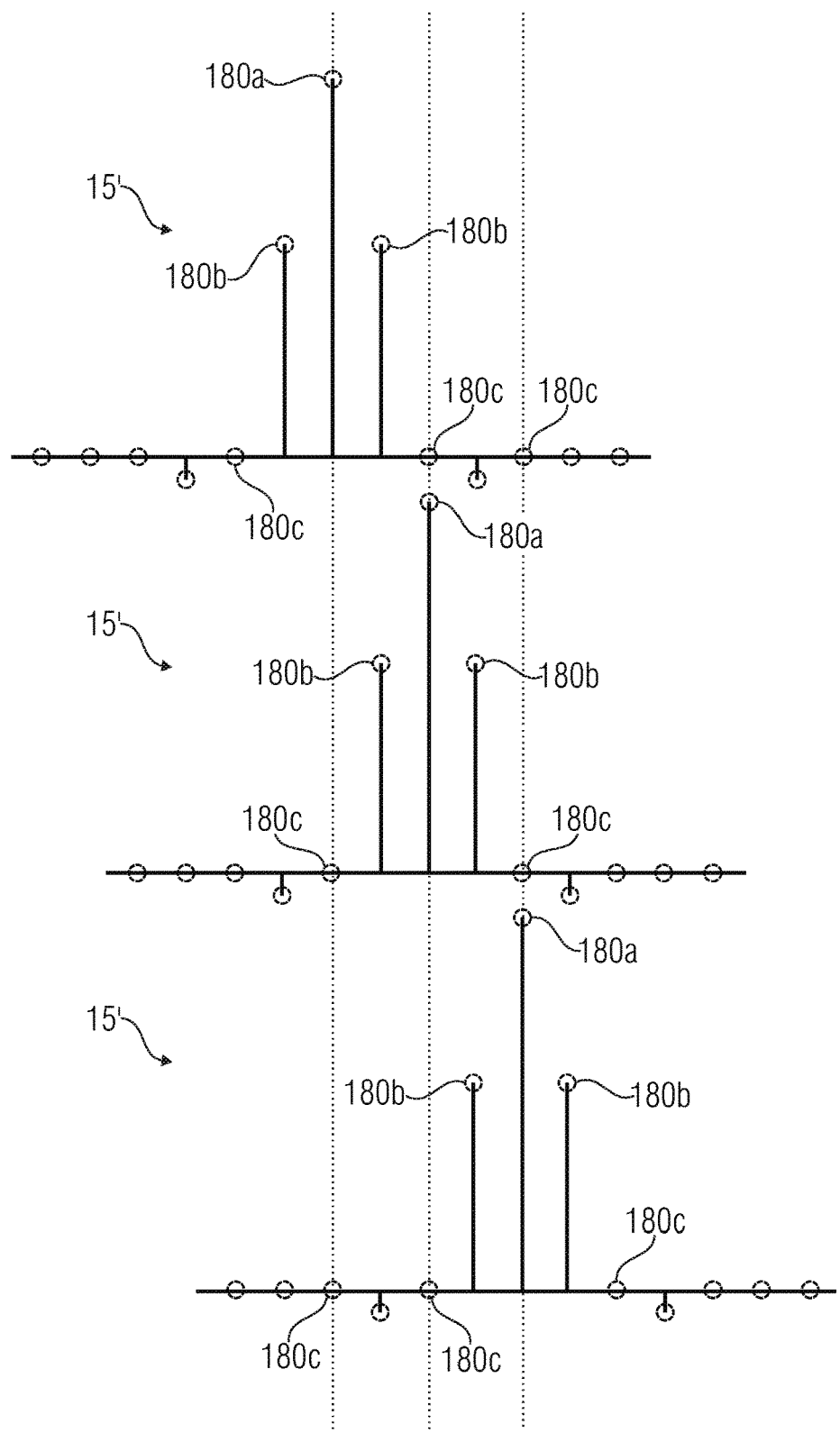
FIG. 11c shows the image of FIG. 11b three times in a row, aligned with an offset of two samples between adjacent filter functions.

FIG. 4 shows a schematic block diagram of the encoder 100 according to an embodiment. Embodiments show the encoder 100 comprising a filter 15 to low-pass filter the data word or the reference pattern to obtain a data pulse comprising a length of more than one sample of a predetermined sample rate, wherein the amplitude of the data pulse is weighted according to the data word or the reference pattern, and wherein the filter is configured to add up consecutive data pulses at instants of the sample rate. Furthermore, the filter may be configured to obtain zero points at samples of a predetermined sample rate of the data pulse. The data pulse comprises a data word comprising grouped secondary media data or the reference pattern. The stream builder is configured to build the stream representing the encoded secondary media data using the reference pattern and a plurality of data words such that zero points of the data pulse are aligned with a maximum of a further data pulse to obtain an inter-symbol-interference (ISI)-free stream representing the encoded secondary media data. In other words, it is advantageous to use a Nyquist filter enabling the decoder to resample the data words or the stream of digital words without inter-symbol-interference or aliasing problems. FIG. 11c shows an embodiment illustrating a filtered data word and building an exemplary stream from three of the data words. According to embodiments, the filter comprises a cut of frequency of less than 1.5 times of a sampling frequency of the primary media data.

It has to be noted that the mapper 115 is not depicted in FIG. 4. However, the mapper may be implemented between register 14 and the filter 15 or being part of one of the blocks or functions.

In other words, FIG. 4 shows the conceptual operation of a transmitter portion of an embodiment of the invention. The audio control data or metadata bitstream is input to a buffer 10 for temporary storage to allow for interruptions in the transmitted data during a vertical sync 160 or other processing operations. The bitstream 125 is parallelized into words of 5 bits and transferred out of the buffer by conceptual register 11. The output of the register is then encoded into a Gray code value by an encoder 12. Except when the vertical sync signal 160 is active, the output of the encoder 12 is input to the register 14. The output of the register 14 is taken as a two's complement binary number, which is sign-extended and mapped into a 16-bit data word as shown in FIG. 8c, and fed into a pulse shaping filter 15. The filter is ideally a Nyquist type filter that exhibits sin(x)/x nulls in its impulse response at symbol periods to prevent inter-symbol-interference. Such filters are well known in digital communications theory. For example, a suitable filter would be a raised-cosine pulse shaping filter with an excess bandwidth parameter set to 0.75. The output of the filter 15 is then fed to further transmission means for inclusion as audio samples in the PCM audio channel and embedding in an SDI video signal. The processing may be driven by a (PCM) sample clock 99 of e.g. 48 kHz.

During the vertical sync interval of the video signal, a conceptual switch 13 selects the output of the reference signal generator 17 for transmission instead of the output of a Gray encoder 12. No data is read from a buffer 10 during this interval. The reference signal generator 17 outputs a symbol value of zero and thus a steady-state PCM value of zero during the vertical blanking interval. At the end of the vertical blanking interval, the reference signal generator outputs eight symbols with code 0x0F and then eight symbols with code 0x11, before the switch 13 returns to the output of Gray encoder 12 and data begins being read from the buffer 10. In this manner (e.g. using scaling in the filter 15) the sixteen-bit signed two's complement PCM signal shown in FIG. 4 is produced, having a value of zero during vertical blanking, then an eight-symbol wide positive pulse 41 of value 0x0780 and then an eight-symbol wide negative pulse 42 of value 0xf880. The pulses 41 and 42 thus form a positive and negative amplitude reference and a strong transition at a symbol edge that may be used in a receiver to recover the original amplitude and phase of the transmitted 32 PAM signal.

Figure 5:
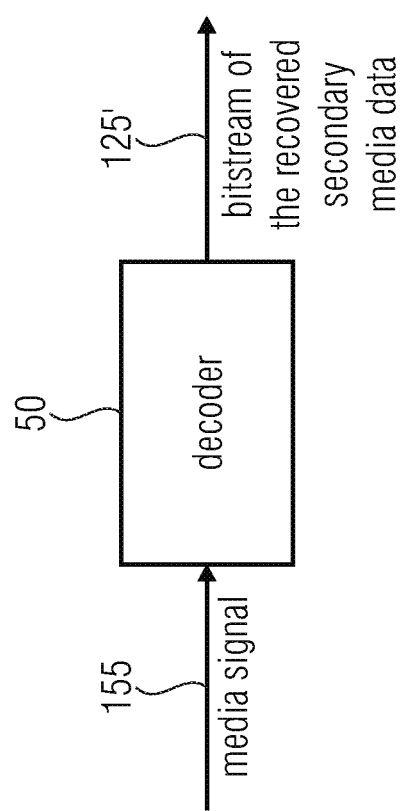
FIG. 5 shows a schematic block diagram of a decoder according to an embodiment.

FIG. 5 shows a schematic block diagram of a decoder 50 for decoding a media signal 155 comprising a received stream 145 of digital words representing encoded secondary media data 55 comprising metadata and control data for primary media data. The decoder 50 is configured to recover the secondary media data using manipulating the received stream of digital words with respect to amplitudes represented by the received digital words or using resampling and wherein the decoder is further configured to derive a bitstream 125' from the recovered secondary media data. The decoder may know original amplitudes or a predetermined timing instant of the digital words before transmission to manipulate the received digital words to recover the secondary media data.

Figure 6:
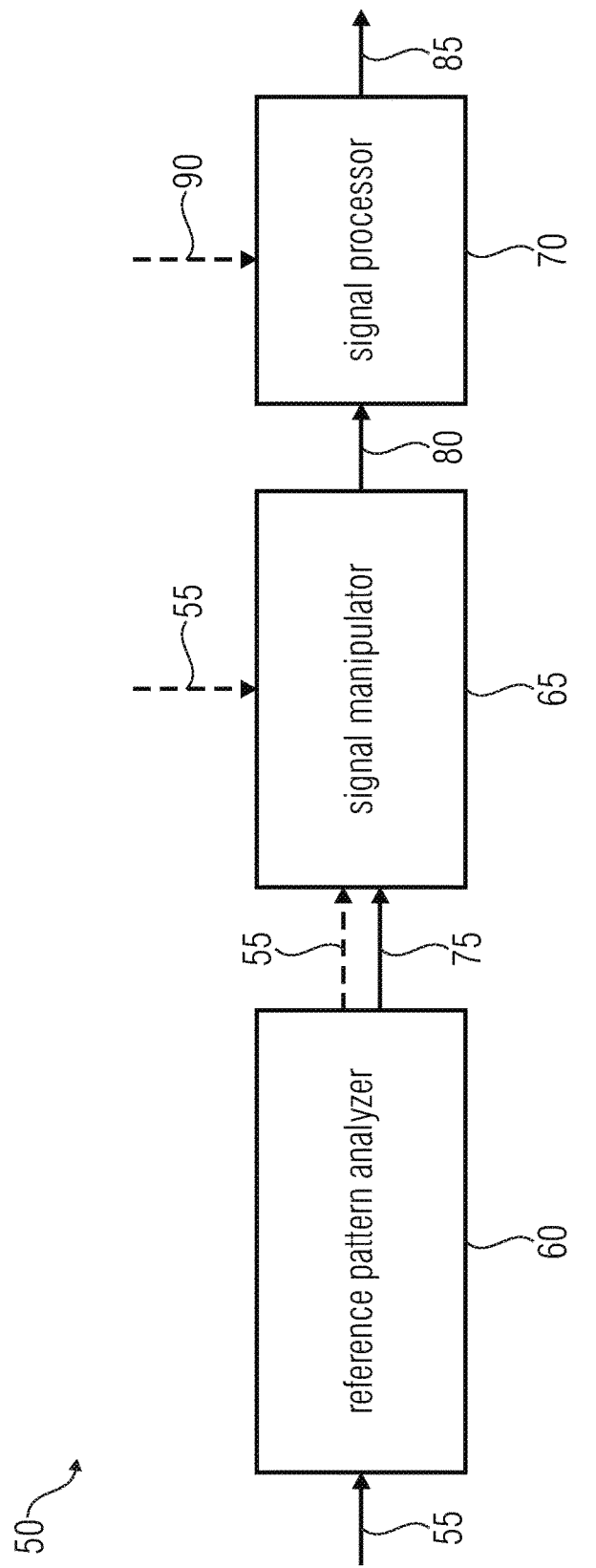
FIG. 6 shows a schematic block diagram of a decoder according to an embodiment.

FIG. 6 shows a schematic block diagram of a decoder 50 for decoding a media signal comprising a stream representing encoded secondary media data using a reference pattern and a plurality of data words. The decoder 50 comprises a reference pattern analyzer 60, a signal manipulator 65, and a signal processor 70. The reference pattern analyzer 60 is configured to analyze the reference pattern of the encoded secondary media data, wherein the reference pattern analyzer 60 is configured to determine an amplitude of the reference pattern or to determine a predetermined timing instant in the primary media data. The signal manipulator 65 receives the encoded secondary media data 55 and the analyzed reference pattern 75 of the reference pattern analyzer 60. The signal manipulator 65 is configured to manipulate the encoded secondary media data 55 in accordance with the analyzed reference pattern 75 and a computed reference pattern to obtain secondary media data 80. The media data, e.g. the data words, may be transmitted separately to the signal manipulator or the media data may be transmitted directly to the signal manipulator through the reference pattern analyzer. The signal processor 70 receives the secondary media data 80 and is configured to process the primary media data 90 according to the encoded secondary media data 55 to obtain a decoded media signal 85.

The media signals will be specified in the further description, especially with respect to FIGS. 8-12. According to embodiments, the encoded secondary media data is pulse code modulated (PCM) comprising pulse amplitude modulated (PAM) symbols in the data words. To obtain the PCM modulated encoded secondary media data, the data words may be PCM modulated.

Figure 7:
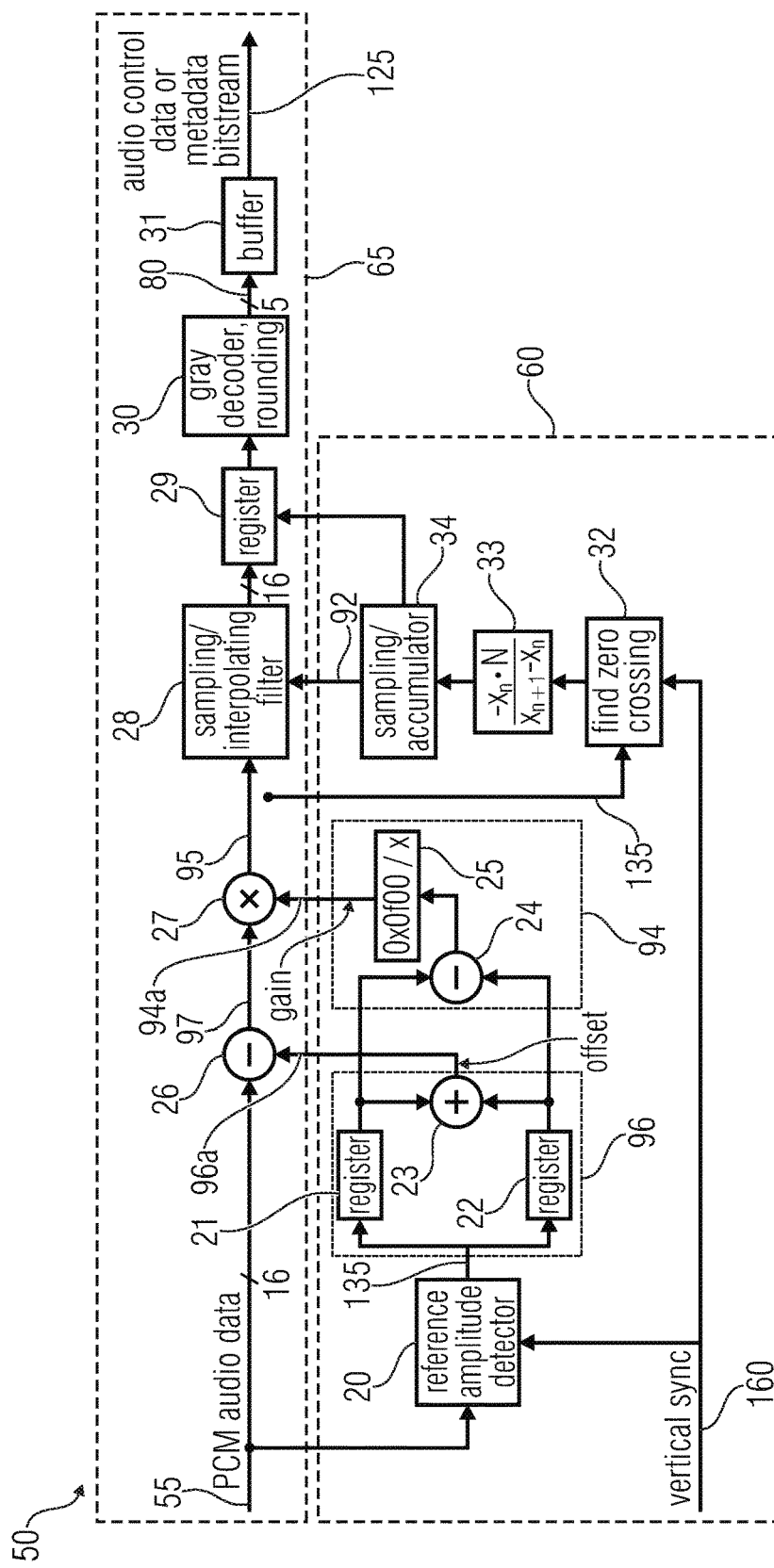
FIG. 7 shows a schematic conceptual block diagram of a receiver portion according to embodiments that accepts PCM data from a 16 bit, 48 kHz PCM audio channel and decodes the embedded 32 PAM signal into a metadata or control data bitstream according to an embodiment.

FIG. 7 shows a schematic block diagram of the decoder 50 according to an embodiment. Herein, embodiments of the reference pattern analyzer 60 and the signal manipulator 65 are shown.

Embodiments show the reference pattern analyzer 60 comprising a gain factor calculator 94 configured to calculate an amplification or attenuation factor according to the amplitude of the reference pattern and the amplitude of the computed reference pattern. Furthermore, the signal manipulator 65 comprises a multiplier 27 configured to amplify or attenuate the encoded secondary media data according to the amplification or attenuation factor to obtain gain compensated encoded secondary media data 95. Therefore, the reference pattern analyzer 60 may further comprise an amplitude detector 20 configured to determine the amplitude of the reference pattern. However, the amplitude of the reference pattern may be compared to a known amplitude of the reference pattern to obtain a gain factor. This method may work for DC-free or, in other words, with gain compensated signals. Therefore, the embodiment shown in FIG. 7 proposes a further gain calculation method by subtracting a positive amplitude in the reference pattern and a negative amplitude in the reference pattern using a subtractor 24 and calculating a fraction of a known difference between the amplitudes and the calculated difference of the amplitudes to obtain the amplification or attenuation factor.

Embodiments further show the reference pattern analyzer 60 comprising an amplitude detector 20 configured to determine the amplitude of the reference pattern and a further amplitude of the reference pattern, wherein the reference pattern analyzer further comprises an offset compensation unit 96 configured to calculate an offset 96a of the encoded secondary media data 55 according to a drift of the amplitude of the reference pattern and a further amplitude of the reference pattern. The signal manipulator 65 therefore comprises an adder configured to add the offset of the encoded secondary media data to the encoded secondary media data to obtain offset compensated encoded secondary media data 97. The drift may be calculated by adding the (positive) amplitude of the reference pattern and the (negative) further amplitude of the reference pattern. The offset, or according to embodiments, one half of the offset, may be subtracted by subtractor 26 from the encoded secondary media data 55 to obtain the offset compensated encoded secondary media data 97.

In other words, FIG. 7 shows the conceptual operation of a receiver portion of an embodiment of the invention. The AES3 PCM audio data (secondary media data) 55 de-embedded from an SDI video signal (primary media data) is input to a reference amplitude detector 20, which averages the central four samples of the PCM audio signal during a pulse period 41 and during a pulse period 42 in the reference pattern 135 (cf. FIG. 7). This may be done using timing circuits based on the vertical sync signal 160 or in an alternate embodiment on a combination of the vertical sync signal 160 and an examination of the incoming PCM values to detect the leading edge of pulse 41 in the reference pattern 135. The mean amplitude of the pulse 41 is thus stored in a register 21 and the mean amplitude of pulse 42 is similarly stored in a register 22. The outputs of the registers 21 and 22 are added to determine the zero level of the original signal and input to a subtractor 26, which removes any DC offset 96a from the signal. The outputs of the registers 21 and 22 are subtracted by a subtractor 24 to determine the peak to peak amplitude of the two pulses 41 and 42. This amplitude is fed to function block 25, which computes an appropriate gain factor 94a to be applied to a multiplier 27 to normalize the output of the subtractor 26 such that the original PCM signal values are nearly reproduced at the output of the multiplier 27. Such functions as described herein will be familiar to those skilled in the art of analog television systems design as a digital implementation of a tri-level sync detector and sync-tip-controlled AGC (automatic gain control) function.

Although the operations of the functions of 20, 21, 22, 23, 24, 25, 26, 27 would ideally restore the exact values of the PCM signal (stream) 145 created at the output of the transmitter filter 15 in an encoder (cf. FIG. 4), rounding errors in arithmetic operations, and ringing or other degradation of the pulses 41 and 42 may cause the output of the multiplier 27 to only approximate the signal produced at the filter 15. This error is reduced by averaging the four central samples of the pulses 41 and 42 in the reference pattern and by using PCM values of sufficient size such that such approximation error does not appreciably affect symbol decisions as described below.

Additionally, the assignment of symbols to PCM values as shown in FIG. 8c allows for amplification of the transmitted PCM signal by up to four bits or approximately 24 dB, and also allows for a similar attenuation of four bits or approximately 24 dB, while still maintaining three LSBs as margin for rounding error or degradation of the signal.

According to further embodiments, the signal manipulator 65 comprises a sample rate converter 28 configured to convert a sample rate associated with the digital words 140, according to a predetermined timing instant of the primary media data indicated in the reference pattern 135, to a predetermined sample rate to obtain resampled digital words. In other words, the received reference pattern may comprise a specific sequence, e.g. a zero crossing between two pulses, wherein the original sequence before transmission is known by the decoder. The decoder can calculate, based on an accurate analysis of the position of the zero crossing, a difference between the sample rate of the stream of digital words before transmission and after receiving the stream of digital words. The difference may be used to decode the stream of digital words using the original sample rate of the data words before transmission.

Embodiments further show the reference pattern analyzer comprising a timing instant determiner 32 configured to determine the predefined timing instant of the primary media data in the reference pattern in terms of samples of a sample rate, an upsampler 33 configured to upsample a range around the determined timing instant to determine an exact position of the timing instant, and a sampling accumulator 34 configured to determine an exact position of the plurality of digital words within the stream of digital words to obtain an actual sample rate 92 associated to the digital words being different from a predetermined sample rate.

It has to be noted that according to embodiments, the predetermined timing instant of the primary media data is indicated as a zero-crossing between a positive amplitude of the reference pattern and a negative amplitude of the reference pattern, indicating that a synchronization signal in the primary media data was sent before the positive amplitude of the reference pattern. Therefore, the reference pattern analyzer is configured to find the zero-crossing in timing instant determiner 32. The upsampler 33 is configured to N-times upsample the area between the sample before the zero-crossing and the sample after the zero-crossing. Therefore, values of the two samples are obtained and the value of one of the N-values between the two samples closest to zero is obtained for the current and a following reference pattern. The sampling accumulator 34 calculates the sample rate between the reference pattern and the following reference pattern or, in other words, calculates that point in time corresponding to the samples in the encoded secondary media data, where the value of the current symbol may be obtained without inter-symbol-interference, for example due to a Nyquist filtering of the encoded secondary media data in the encoder. Therefore, the sample rate converter 28 is configured to sample the encoded secondary media data according to the calculated predetermined timing instants or the actual sample rate 92 of the sampling accumulator 34.

In other words, FIG. 7 further shows a schematic conceptual block diagram of a receiver portion according to embodiments that accepts PCM data from a 16 bit, 48 kHz PCM audio channel and decodes the embedded 32 PAM signal 145 into a metadata or control data bitstream according to an embodiment. To recover the PAM symbols from the normalized PCM data at the output of the multiplier 27, the data should now be sampled at instants corresponding to the center of the symbol period to avoid inter-symbol-interference. This is accomplished as follows: The output of the multiplier 27 is input to a function block 32, which operates in a similar manner to the function of the detector 20 and the registers 21 and 22, and outputs to a block 33 the PCM values of the normalized PCM signal output by multiplier 27 which occur at the zero-crossing between pulses 41 and 42 of the reference pattern.

The function block 33 takes these two PCM values and computes the common algebraic formula for calculating the y-intercept of a linear function as follows:

$$f(x_n, x_{n+1}) = \frac{-x_n \cdot N}{x_{n+1} - x_n}.$$

$x_n$ is the value of the sample left from the zero crossing and $x_{n+1}$ is the value of the sample right from the zero crossing. Thus, it can be determined in which of N subdivisions of a sample period the zero-crossing of the waveform represented by the PCM samples would occur. In the case of this embodiment, N is set equal to 16, though the choice of N is an engineering compromise between increased symbol sampling accuracy and the need to store additional filter coefficients for filter 28 as will be explained below. According to further embodiments, N is set equal to 128 or 256. Any other values may be suitable as well.

The combination of the accumulator 34 and the sampling/interpolating filter 28 is used to resample the input signal from the multiplier 27 at time instants close to the center of the symbol period. The accumulator 34 functions as a fractional accumulator similar to a DDA (digital differential analyzer) such as described in "Principles of Interactive Computer Graphics", Newman and Sproull, 2nd ed., Mc-Graw-Hill, 1979, FIG. 2-9, and is similar to phase accumulators used in digital phase lock loop design and direct digital frequency synthesizers.

In this case, the accumulator 34 is initialized with the zero-crossing subdivision number computed by the function block 33 and then incremented by one-half of the symbol period, which in this case is 1.5 samples of the 48 kHz clock for a 16 kbaud symbol rate, to move the accumulator location from the symbol edge to the symbol center. The accumulator 34 is then incremented by 1.0 for each sample clock and its fractional bits (log 2 N) select a phase of interpolating filter 28, e.g. a polyphase FIR interpolating filter bank. The system of 34 and 28 forms a sample rate converter similar to that described in "A flexible sampling-rate conversion method," Julius O. Smith and P. Gossett, IEEE International Conference on ICASSP 1984, pp. 112-115, March 1984. The design of one approach of the polyphase filters is described in the above paper.

The output of the filter 28 will then contain, at each clock cycle where there is a carry-out from the fractional part of the accumulator 34, a mid-point sample of each received symbol. Upon such carry-out of the sampling accumulator 34, the register 29 is enabled to store the symbol, which is then input to the function block 30, which right-shifts the 16-bit value seven bits with rounding, to recover the transmitted symbol. The value of the five lower bits is then decoded from Gray code and stored in an output buffer 31. The contents of the buffer 31 are then available as the received audio control data or metadata bitstream (e.g. the bitstream of secondary media data 125).

The operation of the accumulator 34 as described above results in adjustment of the symbol sampling phase based solely on the timing reference from the pulses 41 and 42 sent after each vertical sync pulse. It will be understood by those skilled in the art that this will correct phase errors between the incoming symbols and the local symbol sampling clock, but might not completely correct any frequency error. With the design goals above, a 100 ppm frequency error in the transmitter time-base will result in a sample error of 0.15 of a sample clock or 0.050 of the symbol width at the very end of a data payload just before the vertical sync interval.

This error could be further reduced by adding a frequency term to the increment of the accumulator 34. Such a term may be calculated by comparing the fractional part of the accumulator with the value to which it is to be initialized following the vertical sync period. This difference of these values can then be divided by the approximate or exact number of sample clocks since the last vertical sync period and added to the 1.0 value used to increment the sampling accumulator 34. In this manner, most of the effect of a frequency error may be removed.

According to a further embodiment, the signal manipulator comprises a demapper 29 configured to demap grouped secondary media data comprising a first number of bits from the data words comprising a second number of bits being greater than the first number of bits. Additionally or alternatively, the signal manipulator comprises an ungrouper 31 configured to ungroup grouped secondary media data comprising a first number of bits to obtain a decoded bitstream of secondary media data 125', which is a bitstream representation of the secondary media data 80 and therefore represents the bitstream of secondary media data 125.

The following FIGS. 8 to 12 describe embodiments of encoded secondary media data, indicating that the data words are PAM coded and that the application to the (Nyquist) filter 15 results in a PCM signal.

Figure 8A:
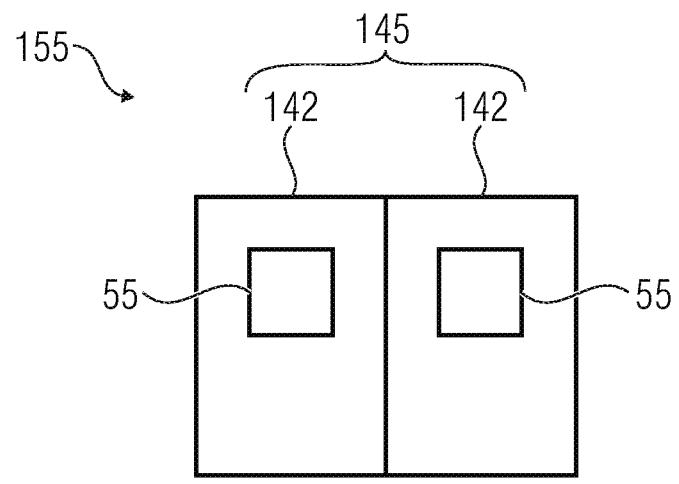
FIG. 8a shows a schematic representation of a media signal according to an embodiment.
Figure 8C:
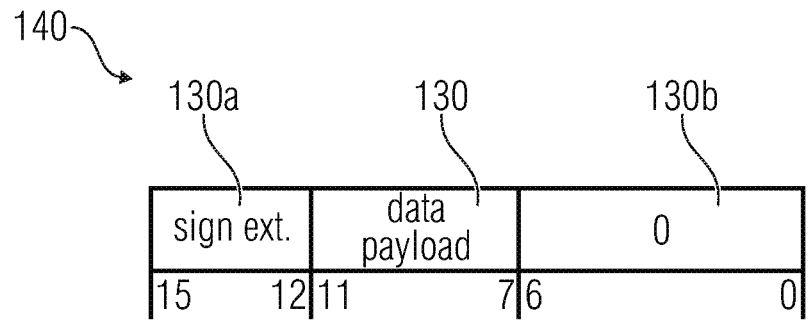
FIG. 8c shows a schematic diagram showing the mapping of the 5-bit 32 PAM signal symbols into the 16-bit PCM audio channel sample word according to an embodiment.

FIG. 8*a* shows a schematic representation of the media signal 155 according to an embodiment. The media signal 155 comprises a stream of digital words 145 representing encoded secondary media data 55 comprising metadata or control data for primary media data.

FIG. 8*b* shows a schematic representation of the media signal 155 according to a further embodiment. The media signal comprises a stream 145 representing encoded secondary media data 55 using a reference pattern 135 and a plurality of data words 140, wherein the plurality of data words comprise secondary media data. Furthermore, the encoded secondary media data is mapped into the plurality of data words with a gap to the most significant bit of the data word or the least significant bit of the data word. According to embodiments, the reference pattern 135 and the data words 140 are filtered to derive the digital words 142, or more precisely, the stream of digital words 145.

The reference pattern comprises the same structure as the data words 140, meaning that the bitstream of secondary media data 125 comprises a reference pattern 135, which is grouped into a grouped reference pattern (according to the grouped secondary media data) and formed in a data word such as the data word 140. This would result in a uniform processing within the encoder 100 shown e.g. in FIG. 4, wherein switch 13 is configured to switch between the reference pattern 135 and the metadata or control data of the primary media data. In other words, the secondary media data comprises the grouped reference pattern and metadata or control data for the primary media data in a first embodiment. In a second embodiment, the reference pattern is independent from the secondary media data. The differentiation is advantageous since the processing of the reference pattern and the metadata or control data is optionally joint or separate from each other. Furthermore, the decoded media signal 85 or the decoded bitstream of secondary media data 125' is ideally identical or at least similar in terms of e.g. rounding errors to the encoded bitstream of secondary media data 55.

Embodiments show the reference pattern 135 comprising a reference amplitude of the encoded secondary media data and a predetermined timing instant in primary media data. According to further embodiments, the media signal comprises a further stream of the primary media data, wherein the primary media data comprises audio data or video data. The further stream comprising primary media data is aligned to the stream of encoded secondary media data at the predetermined timing instant in the primary media data. The primary media 90*a* or 90*b* comprises the timing instant 40 being represented in the reference pattern e.g. by the zero crossing 165.

FIG. 8*c* shows a schematic representation of the data word 140 according to an embodiment. The grouper groups the bitstream of secondary media data into grouped secondary media data 130 comprising five bits (e.g. bits 7 to bit 11), wherein the mapper is configured to sign extend 130*a* the grouped secondary media data to the most significant bit (for example bits 12 to 15), meaning that the first bit (bit 11) of the grouped secondary media data is padded to the bits 15 to 12, and wherein the mapper further pads the gap to the least significant bits (e.g. bits 6 to 0) with zeros 130*b*. Further embodiments show the secondary media data comprising eight bits. The padding to the left or to the right is reduced accordingly by 3 bits in total to obtain a 16 bit data word. Other combinations such as a different length of the secondary media data or the data word or another size of the padding may be also realized. Furthermore, the reference pattern may be processed such that the reference pattern comprises the same structure as the data word 140.

Figure 9A:
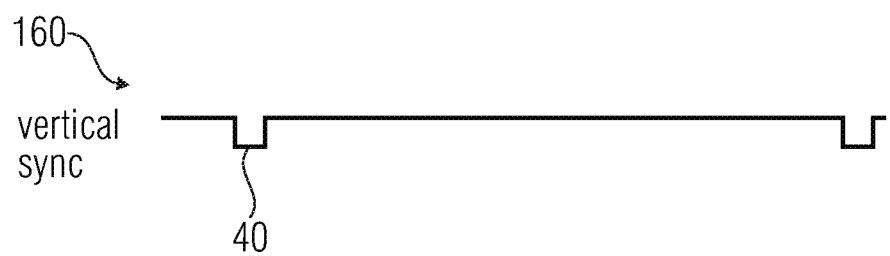
FIG. 9a,b shows a schematic waveform diagram showing the timing relationship between the video facility's vertical sync signal and the encoded metadata or control data in the PCM audio channel according to an embodiment.

FIG. 9*a* shows a timing instant 40 in the primary media data 160 indicating, for example, a vertical blanking interval, or a further synchronization point in the video frame. Advantageously, the synchronization part 40 indicates a suitable point of time in a video frame which indicates a suitable position to cut a stream of video frames. This might be the vertical blanking interval or for example a certain line in the video frame (e.g. line 7), where cutting of a video stream may be performed. Therefore, the distance between two consecutive synchronization pulses is one frame. One frame may comprise 800 or 801 audio samples, which results in around 300 data words per video frame and additional reference pattern, version number, continuity counter, cyclic redundancy check or further overhead.

Figure 9B:
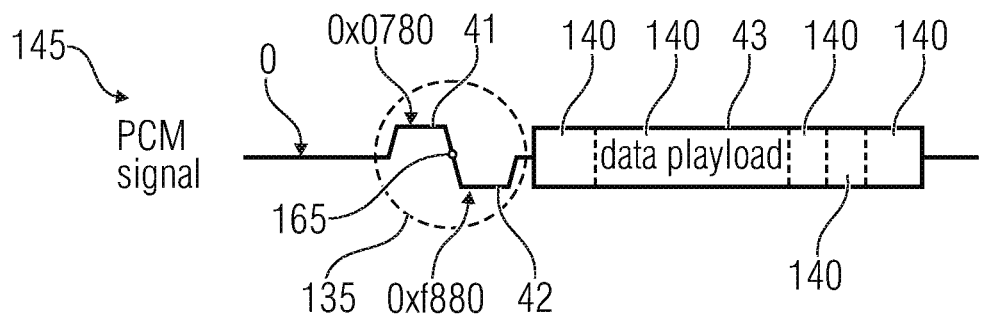

FIG. 9*b* shows a schematic representation of the stream 145 representing encoded secondary media data using a reference pattern and a plurality of data words. Since FIG. 9*b* is aligned to FIG. 9*a*, it is shown that the reference pattern 135 is driven by the timing instant 40. Therefore, the predetermined timing instant 165, being the zero crossing between amplitudes 41 and 42 of the reference pattern according to this embodiment, indicates the timing instant 40 in the synchronization signal 160 of the primary media data. The first amplitude of the reference pattern 41 may comprise an amplitude of 0x0780 HEX, wherein the second amplitude 42 of the reference pattern may comprise a value of 0xf880 HEX. Adjacent to the first and second amplitude of the reference pattern, it may be padded with zeros or, according to further embodiments, the zero padding is part of the reference pattern. After the reference pattern is processed, the stream builder applies the data words 140 to the data payload container 43. Further embodiments show an additional part in the payload container 43, where redundancy is applied e.g. to perform bit error corrections like checksums, parity bits, cyclic redundancy checks, etc. The reference pattern 135 and the data words 140 may be filtered to obtain digital words 142 to form the stream 145.

Figure 10A:
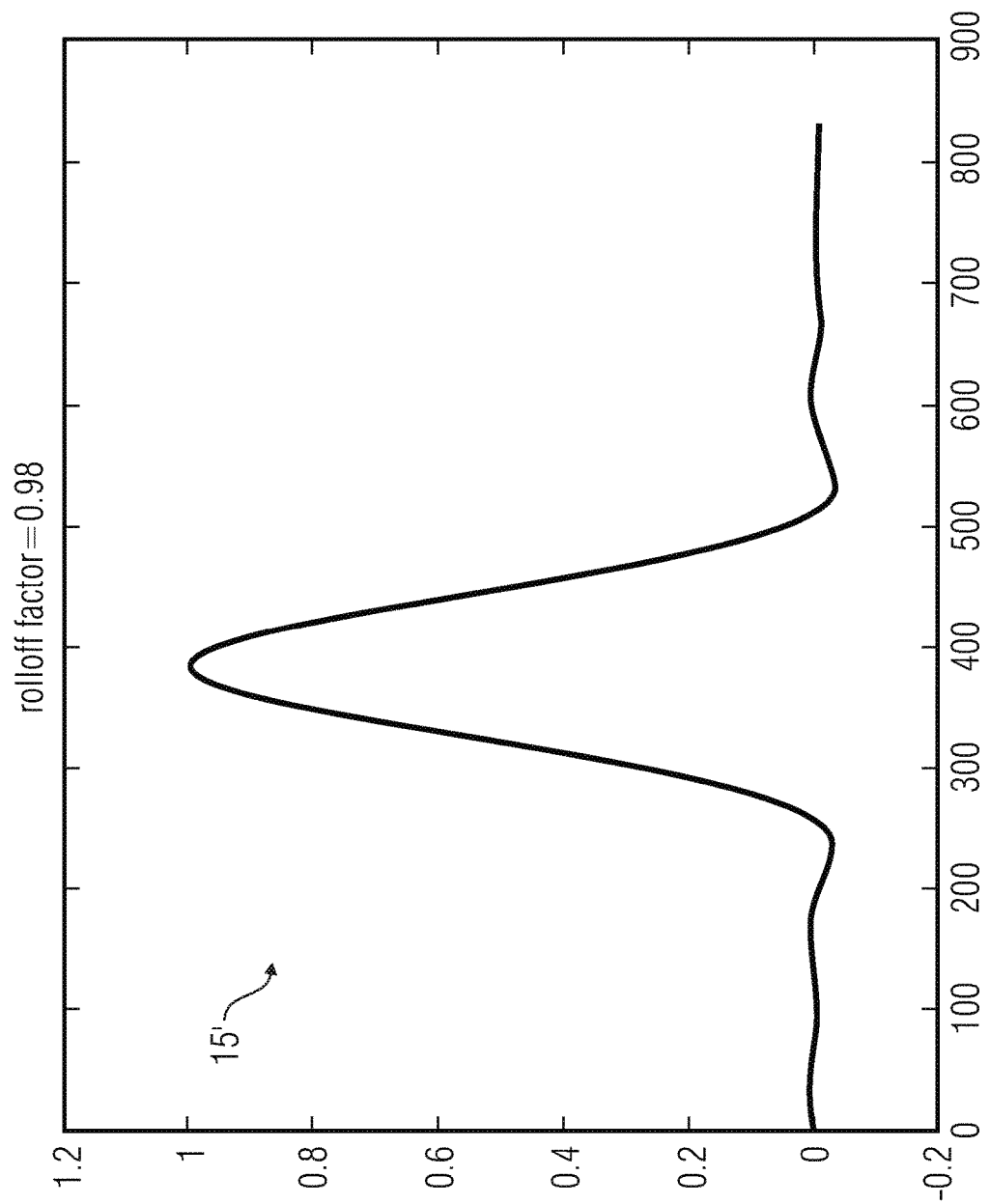
FIG. 10a shows a raised cosine shape filter with a rolloff factor of 0.98 in a time-continuous representation.

The following FIGS. 10 to 12 describe the filter 15, the stream builder 120, and the stream 145 in more detail. FIG. 10*a* shows a raised cosine shape filter with a rolloff factor=0.98, wherein FIG. 10*b* shows the raised cosine shape filter sampled according to a sampling frequency. It may be seen that the raised cosine shape filter having a rolloff factor of 0.98 puts almost all of the energy of the impulse in the three middle samples 180*a*, 180*b*. However, there may be used 13 samples for the addition or more precisely only the seven coefficients that are different from zero. Using only the three middle samples, however, will also enable a good reconstruction of the encoded symbol without aliasing problems or inter-symbol-interference.

FIGS. 11*a* and 11*b* show the raised cosine shape filter function 15' with a rolloff factor 0.7 in a time-continuous representation (FIG. 11*a*) and a time-discrete representation (FIG. 11*b*). FIG. 11*c* shows the image of FIG. 11*b* three times in a row, aligned with an offset of two samples between consecutive filter functions, which may be the data pulse 15'. The filter functions or the data pulses 15' are modulated, e.g. multiplied, with the mapped secondary media data (representing one symbol of secondary media data) or (a symbol) of the reference pattern, each representing a data word 140 or a (PCM modulated) symbol of a reference pattern. The parameters are chosen in such a way that every second sample of the discrete representation of the raised cosine filter is zero. Therefore, two adjacent pulses are placed with a distance of two samples, such that the middle of each pulse is at a position where all other pulses are crossing zero. This concept is quite simple for the modulation process and also simple for the demodulation, where examining the middle sample comprises the compensation for timing errors and gain errors. If a clock deviation, or a difference between an original sampling frequency and an actual sampling frequency, of the digital words after transmission is sufficiently low, a symbol recovery in the decoder may be performed without calculating the source sampling frequency. Furthermore, a small number of amplitude values is beneficial for symbol recovery without sample rate conversion in the decoder. However, it may be advantageous to apply a phase compensation independently from a correction of the clock deviation.

An addition of the values of each sample (from top to bottom) results in the stream 145 of digital words. Furthermore, the amplitude or, in other words, the values of each sample are weighted (e.g. multiplied) with the data word 140 or the symbol of the reference pattern, which may be seen as a pulse amplitude modulation. These schematics are applied to the reference pattern and the data words according to embodiments. Furthermore, it has to be noted that the embodiments described with 24000 symbols per second and 256 amplitude values (8 bit) or 32 amplitude values (5 bit) are exemplary and not limiting the scope of the invention. Other symbol rates are conceivable, both lower and higher symbol rates using sample rate conversion to insert the symbols at zero crossings of the stream comprising secondary media data as well as different resolutions for the amplitude steps.

Figure 12C:
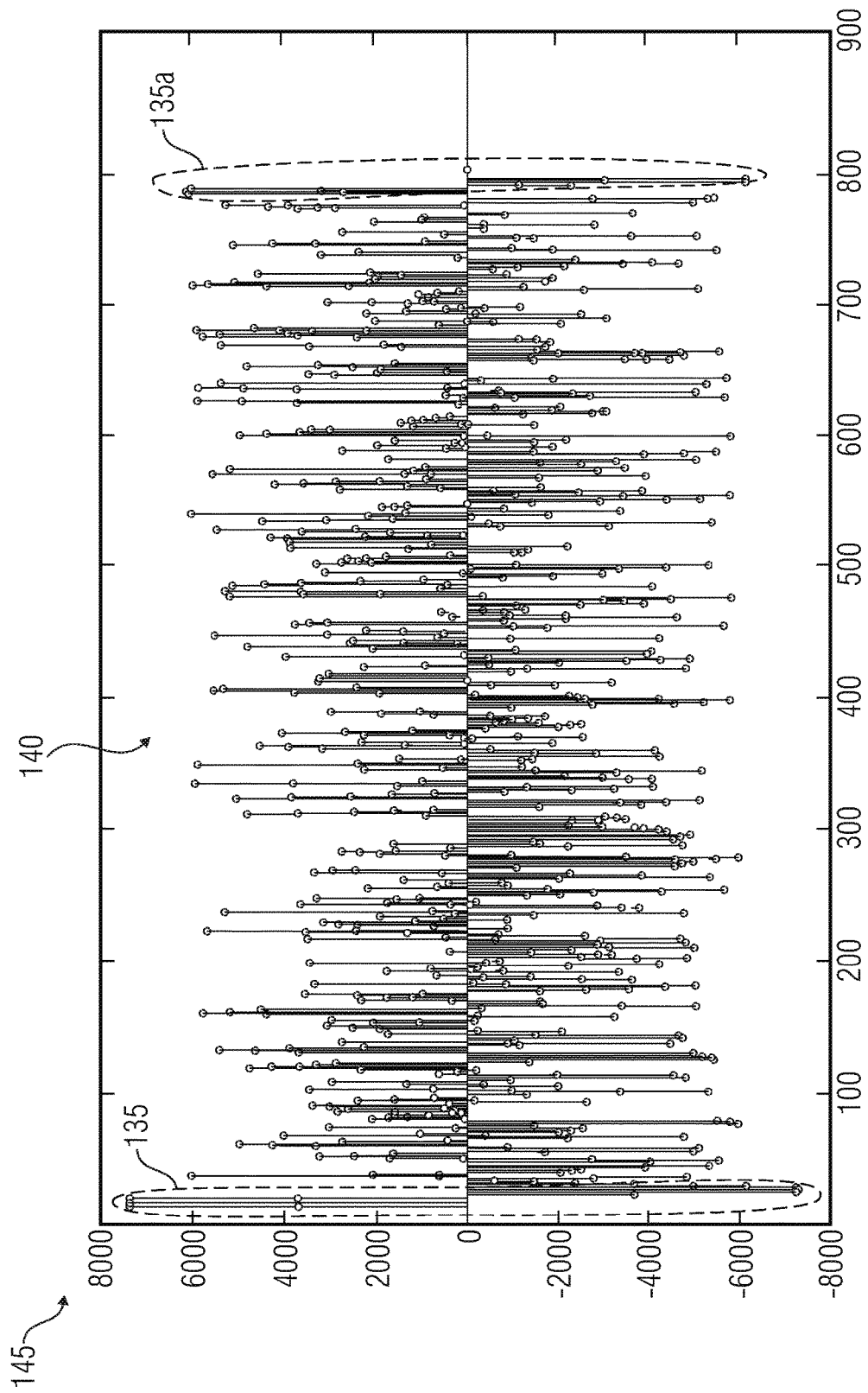
FIG. 12c shows a schematic representation of the stream according to an embodiment in a time-discrete representation according to an embodiment.

FIG. 12 shows a schematic representation of the stream 145 according to an embodiment. FIG. 12*a* shows a schematic time-continuous representation of the stream 145 comprising the filtered reference pattern 135 and the filtered data word 140. Furthermore, a second reference pattern 135*a* is shown, which may be optionally applied at the end of the frame to achieve an accurate timing recovery within a signal frame. Therefore, the second synchronization symbol (or reference pattern) 135*a* might have a slightly lower amplitude than the first synchronization symbol 135 and furthermore, the first synchronization symbol 135 might comprise a higher amplitude than all of the other symbols. In that way, it is very efficient to search for the first synchronization symbol. Furthermore, the data word may comprise one or more redundancy bits to enable an error detection. FIG. 12*b* shows the stream 145 in an enlarged version. FIG. 12*c* shows a signal similar to the signal shown in FIG. 12*a* in a time-discrete form at samples of a sample rate. Furthermore, FIG. 12*d* shows a signal similar to the signal shown in FIG. 12*b* in a time-discrete form.

Figure 13:
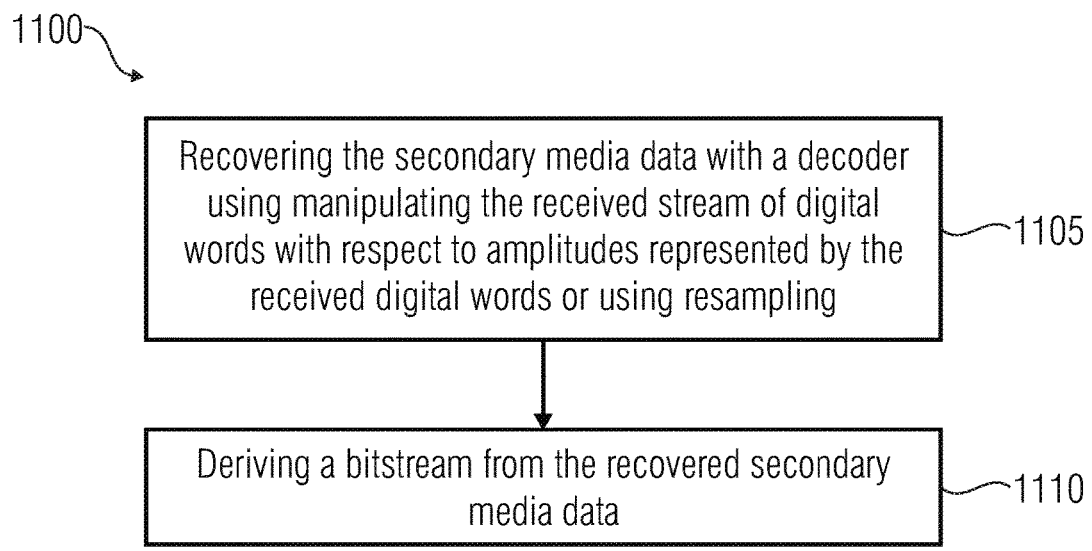
FIG. 13 shows a schematic flow diagram of a method for decoding a media signal comprising a stream representing secondary media data using a reference pattern and a plurality of data words.

FIG. 13 shows a schematic flow diagram of a method 1100 for decoding a media signal comprising a stream representing secondary media data using a reference pattern and a plurality of data words, the method 1100 comprises a step 1105 for recovering the secondary media data with a decoder, the recovering comprising manipulating the received stream of digital words with respect to amplitudes represented by the received digital words or using resampling, and step 1110 for deriving a bitstream from the recovered secondary media data.

Figure 14:
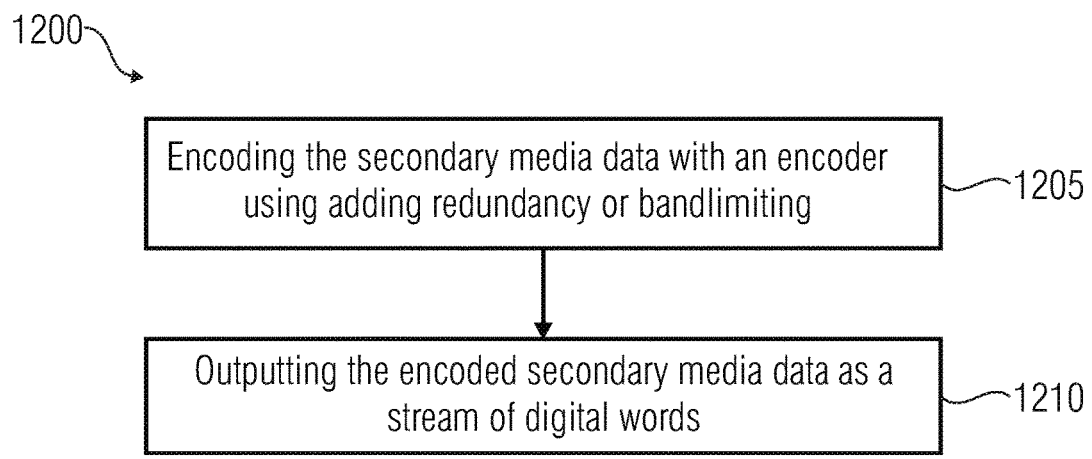
FIG. 14 shows a schematic flow diagram of a method for encoding a media signal with an encoder.

FIG. 14 shows a schematic flow diagram of a method 1200 for encoding a media signal with an encoder. The method 1200 comprises a step 1205 for encoding the secondary media data with an encoder using adding redundancy or bandlimiting and a step 1210 for outputting the encoded secondary media data as a stream of digital words.

Construction Considerations of an Embodiment

The described embodiments may be implemented in software as a series of computer instructions or in hardware components. The operations described here are typically carried out as software instructions by a computer CPU or Digital Signal Processor and the registers and operators shown in the figures may be implemented by corresponding computer instructions. However, this does not preclude embodiments in an equivalent hardware design using hardware components. Further, the operation of the invention is shown here in a sequential, elementary manner. It will be understood by those skilled in the art that the operations may be combined, transformed, or pre-computed in order to optimize the efficiency when implemented on a particular hardware or software platform.

Alternate Embodiment for Audio-Only Systems

The invention may be furthermore used in audio-only system without distributed vertical sync by replacing the vertical sync signal in the transmitter by an equivalent locally generated signal, and by protecting the data bitstream input to register 11 from symbol patterns that will generate pulses identical to pulse 41, through convolutional coding or other means. Reference Amplitude Detector 20 may then be modified to regenerate a local sync signal in the receiver by detection of pulse 41.

In a further embodiment, the modulation for the audio metadata which are provided as a stream of bits to obtain an audio-like digital stream, such as a stream at the output of block 3 in FIG. 1 may comprise several procedures alternatively to each other or in addition to each other. In particular, the stream output by block 3 in FIG. 6 and input into block 4 in FIG. 6 is, for example, a sequence of PCM values such as 16 bits or 32 bits PCM values such as those which are, for example, stored on a CD. Naturally, the control data or metadata bitstream has a certain bitstream syntax and the actual digital words consisting of several bits in the metadata bitstream will typically have variable lengths. However, the block 3, or generally a procedure for generating an audio-like digital stream from the audio control data or metadata comprises a grouper for grouping a first number of bits from the stream. Thus, this means, for example, that a sequence of 5 bits is taken from the metadata bitstream. Then, a state represented by the first number of bits, i.e. by 5 bits, is determined. This state is one of 32 states. Then, in one embodiment, the state is represented by a second number of bits, where the second number of bits is greater than the first number of bits. This representation into the second number of bits can, for example, be a 16 bits representation or a 32 bits representation or so. In any case, however, the second number of bits is greater than the first number of bits so that a certain kind of robustness or redundancy is introduced into the representation. Then, the state represented by the second number bits is written into a sequence of digital words all consisting of the second number of bits and this writing is performed a single time or, in order to even increase the redundancy, more than one time in the sequence. Advantageously, the state is written into the sequence two, three or even more times in sequence so that the audio-like digital stream generated by this embodiment is a stair-like form having a group of identical values followed by another group of identical values and the height or state of these values is only one of a certain number of states, such as only one of the 32 different possible states, although the individual values are not represented by, for example, 5 bits values, but are represented by 16 or 32 bits values. Alternatively, a certain redundancy is already obtained by grouping into the first number of bits and by then writing the first number of bits into the sequence of digital words more than one time in sequence, i.e. by a repetition of a certain number of times.

Depending on the applied redundancy, i.e. a redundancy by having a second number of bits being greater than a first number of bits and/or by repeating the state a certain number of times, different ways of reconstruction on the receiver-side can be performed. For example, when only a kind of repetition is performed, then the for example three subsequent values which should be same are taken and a decision is performed saying that the value is the value which is represented by two or those three values. Thus, a majority decision can be taken.

Alternatively or additionally, and particularly when the embodiment with the second number of bits being greater than the first number of bits has been applied, i.e. when a 5 bit state, for example, is represented by 16 bits, in addition to a majority decision or as a further ingredient of the decision or instead of the majority decision, a low-pass filtering or a mean value calculation or a so can be performed in order to find out or reconstruct the original value.

The inventive transmitted or encoded signal can be stored on a digital storage medium or can be transmitted on a transmission medium such as a wireless transmission medium or a wired transmission medium such as the Internet.

Embodiments show a different PCM channel for the metadata or control data, allowing the essence audio signals (or primary media data) to be transmitted with full quality and resolution. Furthermore, the control data or metadata signal may be transformed into one that can survive typical degradations of PCM audio signals, such as gain changes, time base errors, resampling, changes in delay relative to the primary signal, etc. Moreover, embodiments may operate in the advantageous, but not exclusive, case with unencoded or uncompressed essence signals.

Further embodiments are described below:

The new MPEG-H based TV audio system will bring three primary new features to television broadcasts. "MPEG-H" refers to part 3 of the MPEG-H standard, ISO/IEC 23008-3, and may not relate to the other parts concerned with MMT transport, HEVC video coding, etc. More specifically, to the new TV Audio System developed by the MPEG-H Audio Alliance based on the MPEG-H Audio codec. The three primary new features are:
- Interactivity to enable consumers to choose different audio presentations, such as a home team or away team commentary at a sports event, or to turn up or down particular audio elements in a program—such as dialogue or sound effects—as they like.
- Immersive sound to improve the realism of the sound by adding height channels, using MPEG-H's Higher-Order Ambisonics mode, or statically panned objects above the listener.
- Multi-platform Adaption. Unlike today's TV sound, the MPEG-H system will tailor playback so it sounds best on a range of devices and environments—from quiet home theaters with speakers to the subway or airport with earbuds.

All of these features will be under the control of the broadcaster or content distributor, providing new creative opportunities, such as the ability to efficiently add additional languages, player, or official microphones, or, as the Alliance has demonstrated, car to pit crew radios at races.

Since the MPEG-H Audio system is designed to work over unmodified HD-SDI embedded audio channels, stations can begin implementing MPEG-H Audio features as they choose without changing their internal plant or operating procedures. A four-stage process for broadcasters to consider when adopting MPEG-H is proposed:
1. Transmission of stereo and surround programming using MPEG-H Audio: This would allow broadcasters to gain the bitrate efficiency and new mobile audio features of MPEG-H Audio without any operational changes.
2. Addition of audio objects for additional languages or alternate commentary, enabling viewers to Hear Your Home Team™ audio or listen to their favorite race driver's radio, as well as providing for mandated access features such as visual description.
3. Addition of immersive sound to improve the realism of the sound by adding height channels, Higher-Order Ambisonics, or statically panned objects above the listener.
4. Addition of dynamic audio objects: In contrast to static objects fixed in position, dynamic objects move over time to track video action or provide creative effects. If sound effects are to be panned, for example, a dynamic object can reduce the bitrate that may be useful compared to sending a five or nine channel static object.

Adapting live production and playout for MPEG-H: two approaches

In today's television plants, live or real-time video signals are transported using the HD-SDI interface which supports up to 16 channels of embedded audio. An exemplary system is designed to use these channels directly for the channels, objects, and other audio elements of a program.

Figures 1, 15B:
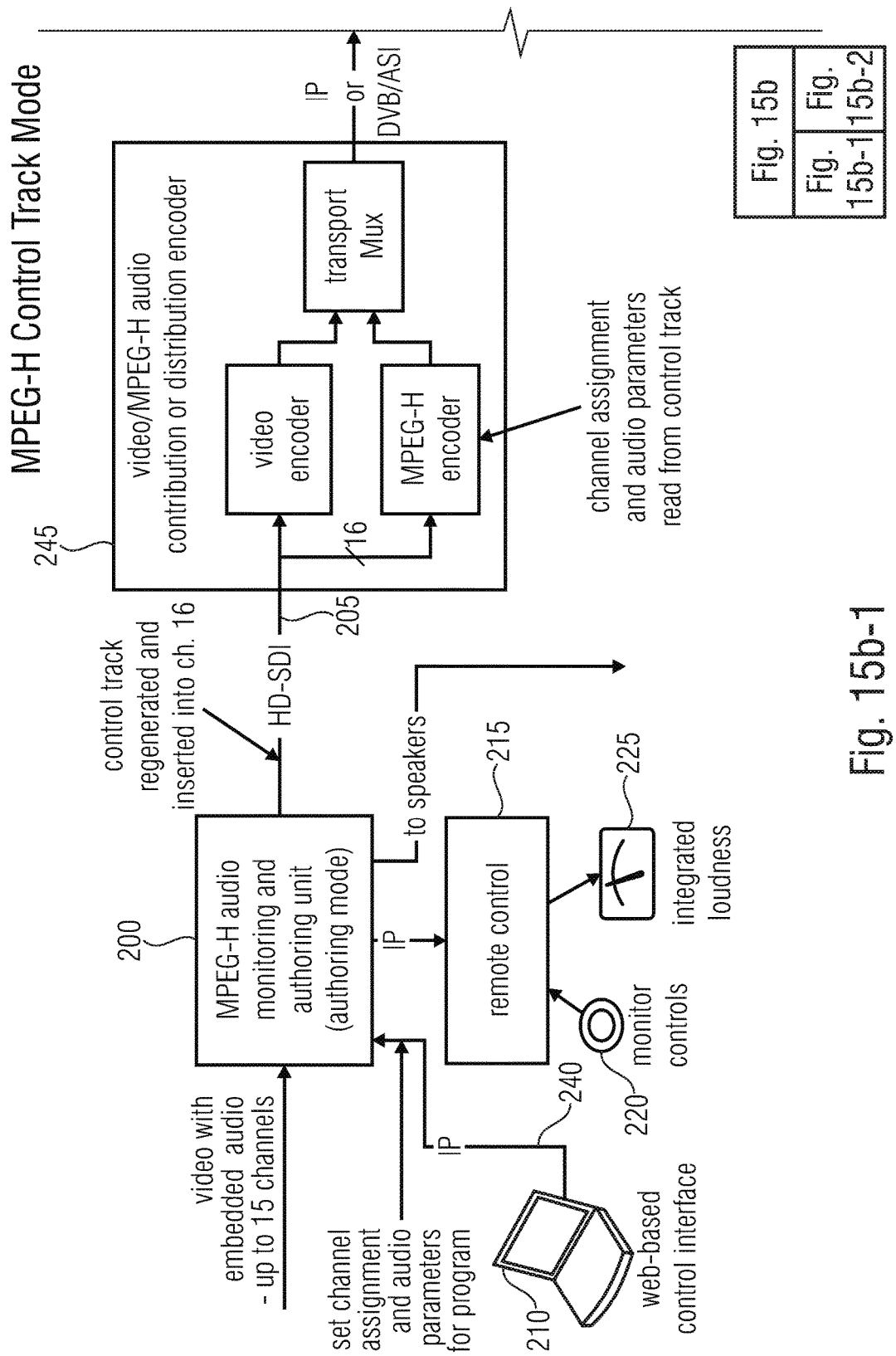
Figures 2, 15B:
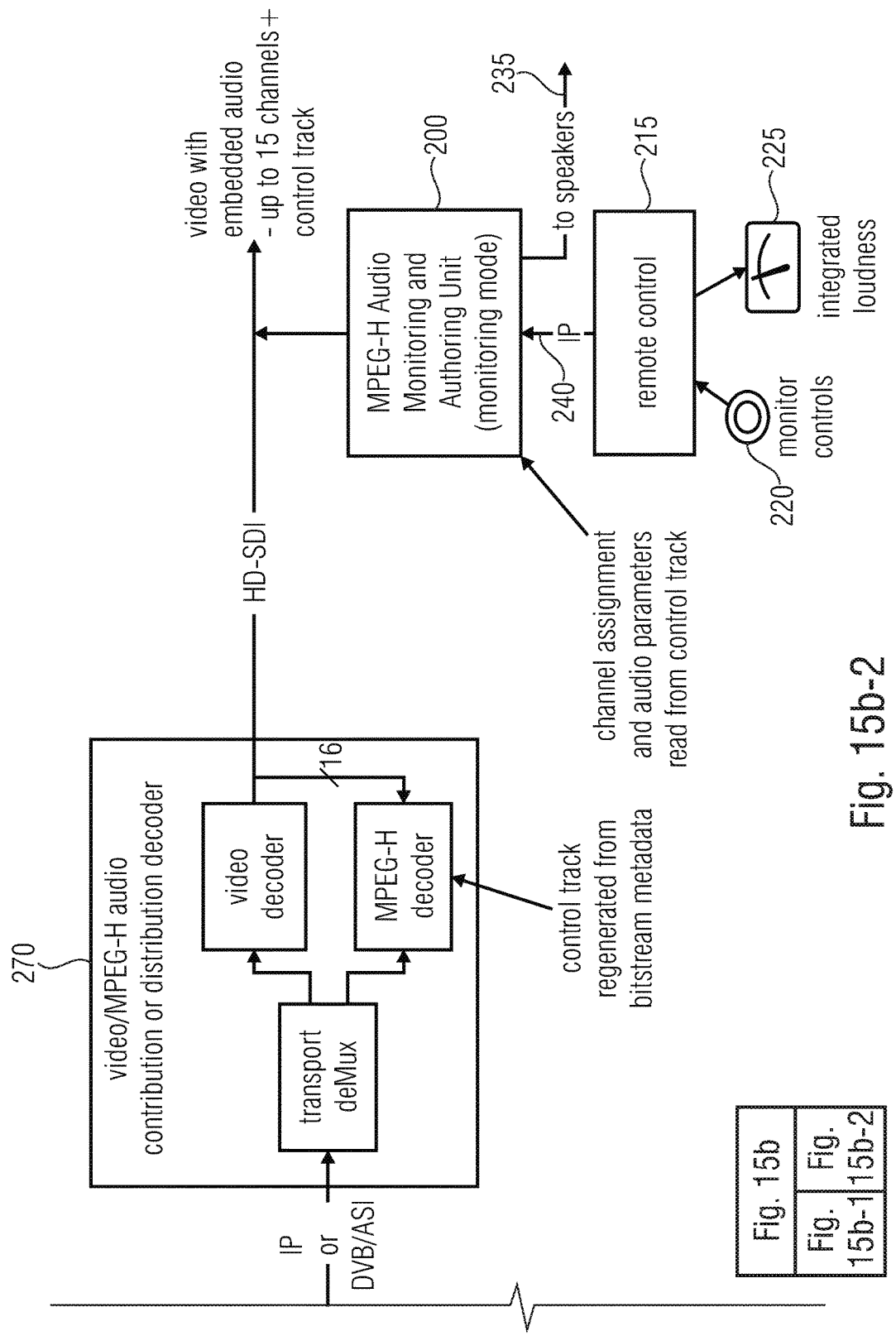

FIG. 15 shows a schematic diagram of a MPEG-H distribution system according to an embodiment, where FIG. 15a-1 and FIG. 15a-2 show the system in a fixed mode and FIG. 15b-1 and FIG. 15b-2 show the system in a Control Track Mode. For stages 1 to 3 above, the traditional approach (c.f. FIG. 15a-1 and FIG. 15a-2) of using a fixed channel map or rundown and fixed encoding metadata may be used. This approach has the advantage of being easy to understand, and may use very little in terms of operational changes if objects are not used or only a few routine objects are used. This approach is termed the Fixed Mode, although presets can be used under external control to change the encoder settings.

The fixed mode represented by FIG. 15a-1 and FIG. 15a-2 basically shows an MPEG-H Audio Monitoring and Authoring Unit 200 which may be operated in monitoring mode. Input to the Monitoring and Authoring Unit 200 is the video with embedded audio 205 such as the HD-SDI signal comprising up to 16 audio channels. The MPEG-H Audio Monitoring and Authoring Unit 200 may be configured to use a web-based control interface 210, which sets fixed presets for channel assignment and audio parameters. Output of the MPEG-H Audio Monitoring and Authoring Unit 200 is a remote control 215 comprising monitor controls 220 and integrated loudness instruments 225. The web-based control interface or the remote control (or both) may be connected to the MPEG-H Audio Monitoring and Authoring Unit 200 by an internet protocol connection 240. Furthermore, the MPEG-H Audio Monitoring and Authoring Unit 200 may be connected to speakers (not shown) using connection 235.

The HD-SDI signal 205 is input to a Video/MPEG-H Audio Contribution or Distribution Encoder 245 comprising a video encoder 250 and an MPEG-H encoder 255. The MPEG-H encoder may be fed with fixed presets for channel assignment and audio parameters using the web-based control interface 210 and the internet protocol connection 240. The output of the video encoder 250 and the MPEG-H encoder 255 is input to a transport multiplexer 260. The multiplexed signal 265 is distributed or transmitted using e.g. internet protocol (IP) or digital video broadcasting asynchronous serial interface (DVB/ASI).

A Video/MPEG-H Audio Contribution or Distribution Decoder 270 receives the multiplexed signal 265 and a transport demultiplexer 275 demultiplexes the multiplexed signal 265. The demultiplexed signal may be fed into a video decoder 280 and a MPEG-H decoder 285 forming a decoded version 205' of the video signal with embedded audio comprising up to 16 channels 205. Further audio processing applied to the decoded signal 205' may be equivalent to the processing of the audio signals in the HD-SDI video signal 205 before transmission.

According to an embodiment, an alternative approach, the Control Track Mode (cf. FIG. 15b-1 and FIG. 15b-2), was developed, which uses a Control Track placed on one of the audio channels, usually channel 16. The control track may comprise the metadata or control data for primary media data.

The schematic block diagram presented in FIG. 15b-1 and FIG. 15b-2 shows a few changes compared to the block diagram described with respect to FIG. 15a-1 and FIG. 15a-2. First of all, the MPEG-H Audio Monitoring Unit 200 operates in authoring mode, which enables the monitoring unit 200 to generate the control track and insert the control track e.g. into channel 16 of the video with embedded audio comprising up to 15 channels. The 16$^{th}$ channel might remain for the control track. Channel assignment and audio parameters for generating the control track may be set by a web-based control interface 210. The further processing of the video signal with embedded audio comprising up to 15 audio channels and the generated control track 205" is similar to the signal processing in FIG. 15a-1 and FIG. 15a-2. However, channel assignment and audio parameters are read from the control track and do not need to be applied using e.g. a web interface.

The Control Track may be synchronized to vertical sync to allow easy video editing and switching. The Control Track is designed to operate just like a longitudinal time code signal. It will survive normal processing of a PCM audio channel, but it cannot be successfully transmitted over a compressed audio channel such as a Layer II contribution codec. For this situation, an MPEG-H Audio contribution encoder may be used, which compresses the audio channels for transmission and converts the control track into metadata carried in the MPEG-H Audio bitstream.

The Control Track:
contains all the configuration information needed by the encoder, including
channel map or rundown
object names or labels
object groups and control limits
program reference level ("dialnorm" in the MPEG terminology), downmix gains, and DRC profiles
position information for dynamic objects
may be switched in routing, production, or master control switchers
will pass through frame synchronizers and other terminal equipment
may be edited with the other audio tracks in a video editor or audio workstation
will pass through an audio console with the other audio tracks
provides frame-accurate transitions of the encoded or monitored audio to match video program switches or edits
does not involve configuring equipment for "data mode" or "non-audio mode" treatment of the control track channel The Control Track, since it is carried in an audio channel with the content, provides automatic setting of all parameters of the MPEG-H Audio Encoder without any manual programming or need to modify other equipment in the plant. The Encoder translates the Control Track information into MPEG-H audio metadata which is transmitted in the encoded bitstream to the MPEG-H Audio Decoder. This mode of operation is termed the Control Track Mode.

Professional Decoders may be operated in a contribution or transmission mode, where they recreate the Control Track signal from the received metadata, or in an emission mode where they render the audio channels just as a consumer decoder would.

The Control Track may be generated by the Audio Monitoring and Authoring Unit used by the audio operator for a live program. For ingest of recorded content, either the HD-SDI signal may be passed through an Audio Monitoring and Authoring Unit for adding the control track during real-time dubbing, or file-based utilities may be used to insert the control track into common file formats such as QuickTime/MP4FF or MXF. Of course, the Audio Monitoring and Authoring Unit also uses the Control Track during monitoring to simulate the actions of the MPEG-H Audio Decoder.

Since the control track may be edited just like any other audio channel, programming with different channel assignments or different objects can be combined in an editor just by dropping items on the editing timeline.

Use of the Control Track means one audio channel is no longer available for objects or channels, but also opens the possibility of using dynamic objects. For panned sounds, such as sound effects, several channels of static objects could be useful to create the effect that may be done with a single-channel dynamic object.

The Control Track approach allows full flexibility in the MPEG-H audio modes used during a broadcast day. It is easily possible to have a show with a stereo bed and two dialogue objects be interrupted by program inserts in full immersive 7.1+4H sound, or even Higher-Order Ambisonics, interspersed with commercial breaks in stereo or 5.1 surround.

One new possibility shown is the ability to broaden the reach of commercials to include demographics who are more comfortable listening to advertisements in their primary language. Local spots intended to reach the broadest possible audience could have voiceovers or dialog in several languages selected by the advertiser. The Preferred Language feature of the exemplary system will present the commercial the viewers preferred language if broadcast, and automatically switch back to the default language for other programming or commercials that do not have that language present.

With certain restrictions on content transitions, primarily during network break and join operations, it is possible to have a mixture of new content with the Control Track signal and legacy content without. For example, the MPEG-H Audio Encoder and MPEG-H Audio Monitoring and Authoring Unit can be set to switch to 5.1 surround mode with a fixed loudness of −24 LKFS (Loudness, K-weighted, relative to Full Scale) and standard downmix gains and DRC profiles, as a facility typically uses today. In this manner, legacy content would be encoded as it is today, and new content with immersive or interactive features would automatically be encoded with the correct settings.

Further embodiments of the invention relate to the following examples:

1. A system for transmitting or receiving data in a digital audio channel by digitally modulating or encoding said data into a signal bandlimited or tolerant of transmission degradations for transmission in said channel, or a signal that is not raw bits somehow packed together, but survives channel degradations.

2. The system of example 1 where the data is control data, metadata, or other data relating to an audio signal carried in a second digital audio channel.

3. A system for transmitting a data-compressed digital audio bitstream in a digital audio channel by digitally modulating or encoding said bitstream for transmission in said channel.

4. The system of example 3 where the data-compressed digital audio bitstream contains metadata or control data 5. The system of example 3 where the data-compressed digital audio bitstream only contains metadata or control data and not the related audio information.
6. The system of example 1 where said digital audio channel is embedded into a digital video signal.
7. The system of example 2 where said digital audio channel is embedded into a digital video signal.
8. The system of example 3 where said digital audio channel is embedded into a digital video signal.
9. The system of example 4 where said digital audio channel is embedded into a digital video signal.
10. The system of example 5 where said digital audio channel is embedded into a digital video signal.
11. Method, apparatus or computer program for modulating audio control data or metadata comprising a stream of bits to obtain an audio-like digital stream, comprising:
grouping a first number of bits;
determining a state represented by the first number of bits;
representing the state by a second number of bits, the second number of bits being greater than the first number of bits and writing the second number of bits into a sequence of digital words consisting of the second number of bits a single time or more than one time in sequence; or
writing the first number of bits into a sequence of digital words more than one time in sequence.
12. Method, apparatus or computer program for demodulating a digital stream to obtain a stream of bits of audio metadata or control data, comprising:
performing a majority decision or a mean value calculation between a sequence of received audio samples to obtain a grouped first number of bits or a quantization of an audio sample into a number of bits; and
syntactically parsing a sequence of bits obtained by concatenating two or more groups of a first number of bits to obtain the metadata information.

Although the present invention has been described in the context of block diagrams where the blocks represent actual or logical hardware components, the present invention can also be implemented by a computer-implemented method. In the latter case, the blocks represent corresponding method steps where these steps stand for the functionalities performed by corresponding logical or physical hardware blocks.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a digital storage medium, for example a floppy disc, a DVD, a Blu-Ray, a CD, a ROM, a PROM, and EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may, for example, be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive method is, therefore, a data carrier (or a non-transitory storage medium such as a digital storage medium, or a computer-readable medium) comprising, recorded thereon, the computer program for performing one of the methods described herein. The data carrier, the digital storage medium or the recorded medium are typically tangible and/or non-transitory.

A further embodiment of the invention method is, therefore, a data stream or a sequence of signals representing the computer program for performing one of the methods described herein. The data stream or the sequence of signals may, for example, be configured to be transferred via a data communication connection, for example, via the internet.

A further embodiment comprises a processing means, for example, a computer or a programmable logic device, configured to, or adapted to, perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example, a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCES

International Organization for Standardization and International Electrotechnical Commission, ISO/IEC 14496-3

Information technology—Coding of audio-visual objects—Part 3: Audio, www.iso.org.

International Organization for Standardization and International Electrotechnical Commission, ISO/IEC 23003-1: 2007 Information technology—MPEG audio technologies—Part 1: MPEG Surround, www.iso.org.

International Organization for Standardization and International Electrotechnical Commission, ISO/IEC DIS 23008-3 Information technology—High efficiency coding and media delivery in heterogeneous environments—Part 3: 3D audio, www.iso.org.

European Telecommunications Standards Institute, ETSI TS 101 154: Digital Video Broadcasting (DVB); Specification for the use of Video and Audio Coding in Broadcasting Applications based on the MPEG-2 transport stream, www.etsi.org.

Advanced Television Systems Committee, Inc., Audio Compression Standard A/52, www.atsc.org.

Dolby Laboratories, Inc., "Post It with Dolby E", www.dolby.com, 2003.

Snell Ltd., "White Paper: Dolby E Processing, Working with Dolby E in a Broadcast Environment", www.snellgroup.com, 2011.

A. W. J. Oomen, M. E. Groenewegen, R. G. van der Waal, and R. N. J. Veldhuis, "A Variable-Bit-Rate Buried-Data Channel for Compact Disc," J. Audio Eng. Soc., vol. 43, p. 23-28 (1995 January/February).

Audio Engineering Society, AES 3-2003, AES standard for digital audio—Digital input-output interfacing—Serial transmission format for two-channel linearly represented digital audio data, www.aes.org, 2003.

Audio Engineering Society, AES10-2008 (r2014): AES Recommended Practice for Digital Audio Engineering—Serial Multichannel Audio Digital Interface (MADI), www.aes.org, 2014.

Audio Engineering Society, AES67-2013: AES standard for audio applications of networks—High-performance streaming audio-over-IP interoperability), www.aes.org, 2013.

Society of Motion Picture and Television Engineers, Ancillary Data Packet and Space Formatting, ST 291-1:2011.

Society of Motion Picture and Television Engineers, 1.5 Gb/s Signal/Data Serial Interface ST 292-1:2012.

Society of Motion Picture and Television Engineers, Format for Non-PCM Audio and Data in an AES3 Serial Digital Audio Interface ST 337:2008.

Society of Motion Picture and Television Engineers, Format of Audio Metadata and Description of the Asynchronous Serial Bitstream Transport ST 2020-1:2014.

"A flexible sampling-rate conversion method," Julius O. Smith and P. Gossett, IEEE International Conference on ICASSP 1984, pp. 112-115, March 1984.

"Principles of Interactive Computer Graphics", Newman and Sproull, 2nd ed., Mc-Graw-Hill, 1979, FIG. 2-9,

The invention claimed is:

1. An encoder for encoding secondary media data comprising metadata or control data for primary media data, the encoder comprising:
a grouper configured for grouping a bitstream of secondary media data to form grouped secondary media data, representing data words;
a reference signal generator for generating a reference pattern indicating a reference amplitude or a predetermined timing instant in the primary media data; and
a stream builder comprising a filter to low-pass filter the data words and the reference pattern to acquire data pulses comprising a length of more than one sample of a predetermined sample rate, wherein an amplitude of a data pulse is weighted according to the grouped secondary media data or the data words or the reference pattern, and wherein the filter is configured to add up consecutive weighted data pulses at instants of the predetermined sample rate to acquire a stream of digital words,
wherein the encoder is configured to output the stream of digital words.

2. The encoder according to claim 1, wherein the encoder is configured to adding redundancy by a digital modulation.

3. The encoder according to claim 2, wherein the digital modulation is so that two or more bits of the secondary media data are transmitted per digital word of the stream of digital words.

4. The encoder according to claim 2, wherein the digital modulation is a pulse amplitude modulation.

5. The encoder according to claim 1, wherein the encoder is configured to output the stream of digital words so that the stream of digital words is transmittable over a Pulse Code Modulation (PCM) audio channel.

6. The encoder according to claim 1, wherein the encoder is configured to output a further stream of digital words, the further stream of digital words representing the primary media data, the further stream being separate from the stream of digital words.

7. The encoder according to claim 6, wherein the primary media data are audio data, and wherein the secondary media data are metadata for the audio data or control data for the audio data.

8. The encoder according to claim 6, wherein the encoder is configured to output the stream of digital words and the further stream of digital words so that the further stream of digital words is transmittable over a first audio Pulse Code Modulation (PCM) channel and so that the stream of digital words is transmittable over a second audio Pulse Code Modulation (PCM) channel being different from the first audio PCM channel.

9. The encoder of claim 6, wherein each of the digital words of the further stream representing the primary media data comprises a predefined number of bits being greater than 8 bits and smaller than 32 bits, and wherein each of the digital words of the stream of digital words comprises the predetermined number of bits as well.

10. The encoder according to claim 1, wherein the encoder is configured to generate the stream of digital words so that the stream of digital words comprises an amplitude reference pattern.

11. The encoder according to claim 1, wherein the encoder is configured to output a video stream representing a sequence of video images, and wherein the encoder is configured to output the stream of digital words so that the control data or meta data of the secondary media data are related to a certain video image of the sequence of video images.

12. The encoder according to claim 11, wherein the encoder is configured to output the stream of digital words as a first stream of digital words associated to a first video image of the sequence of video images, and to output the stream of digital words as a second stream of digital words associated to a second video image of the sequence of video images, wherein the first stream and the second are identical to each other.

13. The encoder according to claim 1,
wherein the encoder is configured to generate the stream of digital words, the digital words of the stream of digital words comprises 12 to 28 bits, or wherein the digital words of the stream of digital words are sampled at a sampling rate of between 30 kHz to 55 kHz, or wherein the digital words of the stream of digital words comprise a dynamic range of 70 to 160 dB, or comprise a nominal signal level of −20 dB RMS full scale.

14. The encoder according to claim 1, wherein the encoder is configured to use an upper frequency for bandlimiting the secondary media data being between 15 kHz to 27.5 kHz for a sampling rate between 30 kHz to 55 kHz.

15. The encoder according to claim 1, the encoder comprising:
a mapper configured for mapping a group of secondary media data comprising a first number of bits into a data word comprising a second number of bits being greater than the first number of bits and wherein the grouped secondary media data is aligned with a gap to a most significant bit or a least significant bit of the data word.

16. The encoder according to claim 1,
wherein the data word comprises the grouped secondary media data, being sign-extended to a most significant bit and a gap between the grouped secondary media data and a least significant bit padded with zeroes, and wherein the reference pattern comprises the same structure as the data word.

17. The encoder according to claim 1,
wherein the filter is configured to acquire zero points at instants of the predetermined sample rate of the data pulses;
wherein the stream builder is configured to build a stream representing the encoded secondary media data using the reference pattern and the plurality of data words such that zero points of a data pulse are aligned with a maximum of a further data pulse to acquire an inter-symbol-interference-free stream representing the encoded secondary media data.

18. The encoder according to claim 1, wherein the filter comprises a cutoff frequency of less than 1.5 times of a sampling frequency of the primary media data.

19. The encoder according to claim 1, wherein the reference signal generator is configured to generate a grouped reference pattern comprising a first number of bits and wherein the reference signal generator is further configured to map the grouped reference pattern into a data word comprising a second number of bits being greater than the first number of bits; or
wherein a mapper is configured to map the grouped reference pattern comprising a first number of bits into a data word comprising a second number of bits being greater than the first number of bits.

20. The encoder according to claim 1, wherein the encoder is configured to output the encoded secondary media data as the stream of digital words as a control track and to output up to 15 channels of the primary media data as audio tracks, wherein the control track and the audio tracks are formed in accordance with the Audio Engineering Society (AES) 3 standard.

21. A decoder for decoding a media signal comprising a received stream of digital words representing encoded secondary media data comprising metadata or control data for primary media data and a reference pattern indicating a reference amplitude or a predetermined timing instant in the primary media data;
wherein the decoder is configured to recover the secondary media data to obtain recovered secondary media data, wherein the recovering comprises:
analyzing the reference pattern to calculate and compensate an amplification or an attenuation or a DC offset applied to the stream of digital words; or
converting a sample rate associated with the stream of digital words, according to the predetermined timing instant indicated in the reference pattern, to a predetermined sample,
wherein the decoder is configured to derive a bitstream from the recovered secondary media data.

22. The decoder according to claim 21, wherein the recovering comprises manipulating the received stream of digital words with respect to amplitudes represented by the received stream of digital words.

23. The decoder according to claim 21, wherein the media signal additionally comprises a further received stream of digital words representing encoded primary media data, the further received stream being separate from the received stream, and wherein the decoder is configured to process the primary media data represented by the further received stream using the metadata or control data represented by the bitstream.

24. The decoder according to claim 21, comprising:
a reference pattern analyzer for analyzing a reference pattern of the encoded secondary media data, wherein the reference pattern analyzer is configured to determine an amplitude of the reference pattern or to determine a predetermined timing instant in the primary media data;
a signal manipulator for manipulating the encoded secondary media data in accordance with the analyzed reference pattern and a computed or known reference pattern to acquire secondary media data; and
a signal processor for processing the primary media data according to the encoded secondary media data to acquire a decoded media signal.

25. The decoder according to claim 21, comprising a reference pattern analyzer for analyzing a reference pattern of the encoded secondary media data, wherein the reference pattern analyzer comprises:
a timing instant determiner configured to determine the predetermined timing instant of the primary media data in the reference pattern in terms of samples of a sample rate;
an upsampler configured to upsample a range around the determined timing instant to determine an exact position of the predetermined timing instant; and
a sampling accumulator configured to determine exact positions of the digital words within the stream of digital words to acquire an actual sample rate associated to the digital words of the stream of digital words, the actual sample rate being different from a predetermined sample rate.

26. The decoder according to claim 21, comprising a reference pattern analyzer for analyzing a reference pattern of the encoded secondary media data, wherein the reference pattern analyzer comprises a gain factor calculator to calculate an amplification or attenuation factor according to the reference amplitude of the reference pattern and an amplitude of a computed or known reference pattern, and wherein the signal manipulator comprises a multiplier configured to amplify or attenuate the data words according to the amplification or attenuation factor to acquire gain compensated data words.

27. The decoder according to claim 21,
comprising a reference pattern analyzer for analyzing a reference pattern of the encoded secondary media data, wherein the reference pattern analyzer comprises an amplitude detector to determine an amplitude of a reference pattern and a further amplitude of the reference pattern;

wherein the reference pattern analyzer further comprises an offset compensation unit configured to calculate an offset of the encoded secondary media data according to a drift of the amplitude of the reference pattern and the further amplitude of the reference pattern, wherein the signal manipulator comprises an adder configured to add the offset of the encoded secondary media data to the encoded secondary media data to acquire offset compensated encoded secondary media data.

28. The decoder according to claim 21, further comprising a signal manipulator for manipulating the encoded secondary media data, wherein the signal manipulator comprises a demapper configured to demap secondary media data comprising a first number of bits from data words comprising a second number of bits being greater than the first number of bits; or wherein the signal manipulator comprises an ungrouper configured to ungroup a group of secondary media data comprising a first number of bits to acquire the bitstream of decoded secondary media data.

29. A method for decoding a media signal comprising a received stream of digital words representing encoded secondary media data comprising metadata or control data for primary media data and a reference pattern indicating a reference amplitude or a predetermined timing instant in the primary media data, the method comprising:

recovering the secondary media data to obtain recovered secondary media data, wherein the recovering comprises:

analyzing the reference pattern to calculate and compensate an amplification or attenuation or a DC offset applied to the stream of digital words; or converting a sample rate associated with the stream of digital words, according to the predetermined timing instant indicated in the reference pattern, to a predetermined sample; and deriving a bitstream from the recovered secondary media data.

30. A method for encoding secondary media data comprising metadata or control data for primary media data, the method comprising:

grouping a bitstream of secondary media data to form grouped secondary media data, representing data words;

generating a reference pattern indicating a reference amplitude or a predetermined timing instant in the primary media data;

low-pass filtering the data words and the reference pattern using a filter to acquire data pulses comprising a length of more than one sample of a predetermined sample rate, wherein an amplitude of a data pulse is weighted according to the grouped secondary media data or data words or the reference pattern, and wherein the filter is configured to add up consecutive weighted data pulses at instants of the predetermined sample rate to acquire a stream of digital words; and outputting the stream of digital words as encoded secondary media data.

31. A non-transitory digital storage medium having a computer program stored thereon to perform a method for decoding a media signal comprising a received stream of digital words representing encoded secondary media data comprising metadata or control data for primary media data and a reference pattern indicating a reference amplitude or a predetermined timing instant in the primary media data, the method comprising:

recovering the secondary media data to obtain recovered secondary media data, wherein the recovering comprises:

analyzing the reference pattern to calculate and compensate an amplification or an attenuation or a DC offset applied to the stream of digital words; or converting a sample rate associated with the stream of digital words, according to the predetermined timing instant indicated in the reference pattern, to a predetermined sample rate; and deriving a bitstream from the recovered secondary media data, when said computer program is run by a computer.

32. A non-transitory digital storage medium having a computer program stored thereon to perform a method for encoding secondary media data comprising metadata or control data for primary media data, the method comprising:

grouping a bitstream of secondary media data to form grouped secondary media data, representing data words;

generating a reference pattern indicating a reference amplitude or a predetermined timing instant in the primary media data;

low-pass filtering the data words and the reference pattern using a filter to acquire data pulses comprising a length of more than one sample of a predetermined sample rate, wherein an amplitude of a data pulse is weighted according to the grouped secondary media data or data words or the reference pattern, and wherein the filter is configured to add up consecutive weighted data pulses at instants of the predetermined sample rate to acquire a stream of digital words; and outputting the encoded secondary media data as the stream of digital words, when said computer program is run by a computer.

33. A data processing system comprising:

an encoder; and a decoder for decoding a media signal comprising a received stream of digital words representing encoded secondary media data comprising metadata or control data for primary media data and a reference pattern indicating a reference amplitude or a predetermined timing instant in the primary media data;

wherein the decoder is configured to recover the secondary media data to obtain recovered secondary media data, wherein the recovering comprises:

analyzing the reference pattern to calculate and compensate an amplification or an attenuation or a DC offset applied to the stream of digital words; or converting a sample rate associated with the stream of digital words, according to the predetermined timing instant indicated in the reference pattern, to a predetermined sample, wherein the decoder is configured to derive a bitstream from the recovered secondary media data.

34. The data processing system of claim 33, further comprising:

a signal manipulator for manipulating the stream of digital words to acquire a manipulated stream of digital words, wherein the decoder is configured to recover a result stream of digital words from the manipulated stream of digital words.

35. The data processing system of claim 34, wherein the signal manipulator is configured to manipulate by an amplitude amplification or an amplitude attenuation or an offset introduction or an offset variation or a frequency selective attenuation or an amplification or a resampling, and wherein the decoder is configured to recover the result stream of digital words manipulated by the amplitude amplification or the amplitude attenuation or the offset introduction or the offset variation or the frequency selective attenuation or the amplification or the resampling.

36. The data processing system of claim 34, wherein the signal manipulator is configured to receive a Pulse Code Modulation (PCM) audio channel and to output a Pulse Code Modulation (PCM) audio channel, wherein the encoder is configured to output a signal transmittable over the Pulse Code Modulation (PCM) audio channel, and wherein the decoder is configured to receive the received stream from the Pulse Code Modulation (PCM) audio channel.

* * * * *